(12) United States Patent
Watanabe et al.

(10) Patent No.: US 10,591,729 B2
(45) Date of Patent: Mar. 17, 2020

(54) WEARABLE DEVICE

(71) Applicant: KYOCERA Corporation, Kyoto-shi, Kyoto (JP)

(72) Inventors: Akiko Watanabe, Hachioji (JP); Osamu Hashimoto, Okaya (JP); Tomohiro Sudou, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/577,657

(22) PCT Filed: May 27, 2016

(86) PCT No.: PCT/JP2016/065810
§ 371 (c)(1),
(2) Date: Nov. 28, 2017

(87) PCT Pub. No.: WO2016/194844
PCT Pub. Date: Dec. 8, 2016

(65) Prior Publication Data
US 2018/0164589 A1    Jun. 14, 2018

(30) Foreign Application Priority Data

May 29, 2015  (JP) ................................ 2015-109497
May 29, 2015  (JP) ................................ 2015-109498

(51) Int. Cl.
*G02B 27/01*     (2006.01)
*G06F 3/0482*    (2013.01)
(Continued)

(52) U.S. Cl.
CPC ....... *G02B 27/017* (2013.01); *G02B 27/0101* (2013.01); *G06F 1/163* (2013.01);
(Continued)

(58) Field of Classification Search
CPC .............. G02B 27/017; G02B 27/0172; G02B 27/0176; G02B 27/0093; G02B 2027/0132–0136; G02B 2027/0174; G02B 2027/0178; G06F 3/012; G06F 3/013; H04N 5/7491
See application file for complete search history.

(56) References Cited

U.S. PATENT DOCUMENTS 9,678,342 B2    6/2017  Yamamoto et al.
2011/0138285 A1*  6/2011  Kuo ........................ G06F 3/017
                                              715/727
(Continued)

FOREIGN PATENT DOCUMENTS

JP      2014-71756 A    4/2014
JP      2014-71811 A    4/2014
(Continued)

OTHER PUBLICATIONS

International Search Report in PCT/JP2016/065810, dated Aug. 30, 2016. 4pp.

*Primary Examiner* — Priyank J Shah
(74) *Attorney, Agent, or Firm* — Hauptman Ham, LLP

(57) ABSTRACT

A wearable device according to one aspect of embodiments includes a display unit arranged in front of eyes, and a detector configured to detect whether an electronic device is present in a predetermined space in front of the wearable device. If the another electronic device is present in the predetermined space and performs predetermined display, the wearable device displays additional information related to the displaying on the display unit.

12 Claims, 19 Drawing Sheets

(51) Int. Cl.
   *G06F 3/0488* (2013.01)
   *G06F 3/0481* (2013.01)
   *G06F 1/16* (2006.01)
   *G06F 3/01* (2006.01)
   *H04W 4/80* (2018.01)
   *G06F 3/0485* (2013.01)
   *H04N 5/64* (2006.01)
   *H04W 4/02* (2018.01)

(52) U.S. Cl.
   CPC .............. *G06F 3/011* (2013.01); *G06F 3/017* (2013.01); *G06F 3/0481* (2013.01); *G06F 3/0482* (2013.01); *G06F 3/0485* (2013.01); *G06F 3/0488* (2013.01); *H04W 4/80* (2018.02); *G02B 2027/014* (2013.01); *G02B 2027/0138* (2013.01); *G02B 2027/0178* (2013.01); *G02B 2027/0187* (2013.01); *H04N 5/64* (2013.01); *H04W 4/02* (2013.01)

(56) References Cited

U.S. PATENT DOCUMENTS

| | | | |
|---|---|---|---|
| 2012/0102438 A1* | 4/2012 | Robinson | G06F 3/011 715/863 |
| 2013/0174213 A1* | 7/2013 | Liu | G02B 27/017 726/1 |
| 2014/0015736 A1* | 1/2014 | Kim | G06F 3/1454 345/1.2 |
| 2014/0126018 A1 | 5/2014 | Sugimoto | |
| 2014/0232747 A1 | 8/2014 | Sugimoto et al. | |
| 2015/0143283 A1* | 5/2015 | Noda | G06F 3/017 715/784 |
| 2015/0302653 A1* | 10/2015 | Algreatly | G06F 3/0488 345/633 |
| 2016/0027216 A1* | 1/2016 | da Veiga | G02B 27/0172 345/419 |
| 2016/0034039 A1* | 2/2016 | Maeda | G06F 3/011 715/810 |
| 2016/0054567 A1* | 2/2016 | Kim | G02B 27/0172 345/8 |
| 2016/0292922 A1* | 10/2016 | Kasahara | G06F 3/1454 |
| 2017/0206673 A1* | 7/2017 | Kawamoto | G06T 7/70 |
| 2017/0255010 A1 | 9/2017 | Yamamoto et al. | |
| 2018/0063397 A1* | 3/2018 | Sudou | G02B 27/0179 |

FOREIGN PATENT DOCUMENTS

| | | |
|---|---|---|
| JP | 2014-71812 A | 4/2014 |
| JP | 2014-93036 A | 5/2014 |
| JP | 2014-157482 A | 8/2014 |
| JP | 2014-186361 A | 10/2014 |

* cited by examiner

WEARABLE DEVICE

CROSS-REFERENCE TO RELATED APPLICATION(S)

The present application is a national phase of International Application No. PCT/JP2016/065810 filed May 27, 2016 and claims priority to Japanese Patent Application No. 2015-109497 filed on May 29, 2015, and Japanese Patent Application No. 2015-109498 filed on May 29, 2015.

FIELD

The present disclosure relates to a wearable device that is able to be mounted on a head of a user.

BACKGROUND

As a wearable device that is able to be mounted on a head, an information processing device has been disclosed and the device includes a display unit with a screen arranged so as to be placed in a field of view of a user, a communicating unit that communicates with a mobile device carried by the user, a detector that detects, via the communicating unit, a user operation performed on the mobile device, and a display controller that controls displaying a scroll item that is automatically scrolled in a first direction within the screen in response to the user operation detected by the detector.

Another information processing device has been disclosed and the device includes a display controller that recognizes, in a captured image, an external device that is present in a real space that appears in a field of view of a user, and arranges and displays a display item such that the recognized external device is not hidden by the display item.

SUMMARY

A wearable device according to one embodiment including a display unit arranged in front of eyes includes a detector configured to detect whether another electronic device is present in a predetermined space in front of the wearable device. Additional information related to predetermined display is displayed on the display unit if the another electronic device is present in the predetermined space and performs the predetermined display.

Further, a wearable device according to one embodiment includes a display unit arranged in front of eyes, a detector configured to detect a predetermined object that is present in a real space, and a controller configured to display additional information related to the predetermined object at a position not overlapping with the predetermined object in a display region of the display unit if the predetermined object is present in a predetermined space in front of a user. A selection process on the additional information is performed if it is detected that the predetermined object has moved and overlapped with a region in which the additional information is displayed.

Further, a wearable device according to one embodiment includes a display unit arranged in front of eyes, and a detector configured to detect a predetermined object that is present in a real space. An image including additional information related to the predetermined object is displayed such that the image encompasses the predetermined object in a display region of the display unit if the predetermined object is present in a predetermined space in front of a user.

Further, a wearable device according to one embodiment including a display unit arranged in front of eyes includes a detector configured to detect whether another electronic device is present in a real space. An image related to a display of the another electronic device is displayed so as to overlap with the another electronic device if a display screen of the another electronic device has an inclination that is a predetermined angle or more with respect to a display surface of the display unit of the wearable device based on a detection result of the detector.

Further, a wearable device according to one embodiment includes a display unit arranged in front of eyes of a user, and a detector configured to detect another electronic device that is present in a predetermined space in front of a user. If the detector detects that another electronic device has entered the predetermined space while an image is displayed on the display unit, a size of the image is changed in accordance with a movement of a position of the another electronic device that has entered, and if a moving speed of the another electronic device in the predetermined space becomes less than a predetermined value, a change in the size of the image is completed.

Further, a wearable device according to one aspect includes a display unit arranged in front of eyes of a user and configured to display an image including a plurality of display elements, and a detector configured to detect a predetermined object that is present in a predetermined space in front of the user. If the detector detects that a predetermined object has entered the predetermined space while the image is displayed on the display unit, a size of the image is changed in accordance with a movement of a position of the predetermined object that has entered, and if the size of the image is changed and a width of the image in a predetermined direction becomes a predetermined length or less, at least one display element is separated from the display elements included in the image and the separated display element is displayed on an outside of a region of the image.

DETAILED DESCRIPTION

Hereinafter, embodiments for carrying out a wearable device according to the present disclosure will be described in detail with reference to the drawings. The present disclosure is not limited by the descriptions below. Constituent elements in the descriptions below include elements easily conceived by a person skilled in the art, elements substantially the same, and elements within the scope of so-called equivalents. In the wearable device that is able to be mounted on a head of a user, further improvement in operability is desired. An embodiment of the present disclosure is to provide a wearable device with improved operability.

Figure 1:
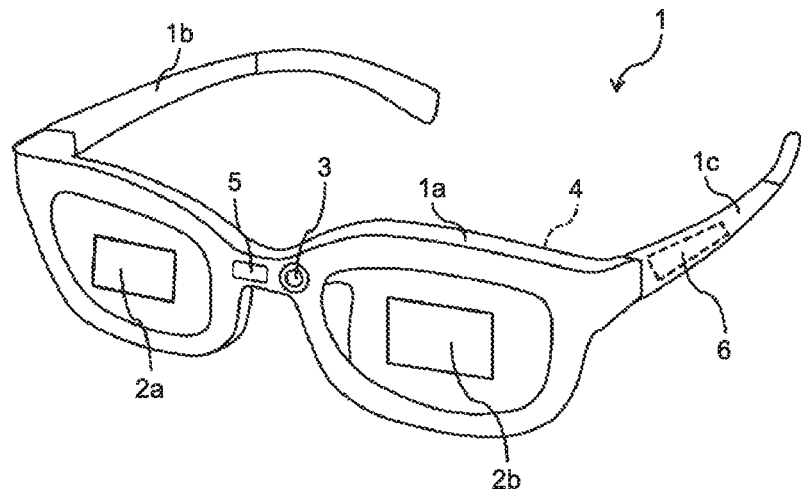
FIG. 1 is a perspective view of a wearable device.

First of all, an overall configuration of a wearable device 1 will be described with reference to FIG. 1. FIG. 1 is a perspective view of the wearable device 1. As illustrated in FIG. 1, the wearable device 1 is a head-mount type device mounted on a head of a user.

The wearable device 1 includes a front surface portion 1a, a side surface portion 1b, and a side surface portion 1c. The front surface portion 1a is arranged in front of a user so as to cover both eyes of the user when mounted. The side surface portion 1b is connected to one end portion of the front surface portion 1a. The side surface portion 1c is connected to the other end portion of the front surface portion 1a. The side surface portion 1b and the side surface portion 1c are supported by ears of the user like temples of a pair of glasses when mounted, and stabilize the wearable device 1. The side surface portion 1b and the side surface portion 1c may be configured so as to be connected with each other on the back of the head of the user when mounted.

The front surface portion 1a includes a display unit 2a and a display unit 2b on a surface facing the eyes of the user when mounted. The display unit 2a is disposed at a position facing the right eye of the user when mounted. The display unit 2b is disposed at a position facing the left eye of the user when mounted. The display unit 2a displays an image for the right eye, and the display unit 2b displays an image for the left eye. In this manner, the wearable device 1 includes the display unit 2a and the display unit 2b each of which displays images corresponding to the respective eyes of the user when mounted, and therefore can realize three-dimensional display using a parallax of the both eyes.

The display unit 2a and the display unit 2b constitute a pair of semi-transparent displays; however, the embodiments are not limited thereto. For example, the display unit 2a and the display unit 2b may be provided with lenses such as spectacle lenses, sunglass lenses, or UV-cut lenses, but the display unit 2a and the display unit 2b may be provided separately from the lenses. The display unit 2a and the display unit 2b may be configured as a single display device as long as different images can be separately provided to the right eye and the left eye of the user.

The front surface portion 1a includes an imager 3 (or also referred to as an out-camera). The imager 3 is arranged in a central portion of the front surface portion 1a. The imager 3 acquires an image in a predetermined range of scenery in front of the user. The imager 3 is also able to acquire an image in a range corresponding to a field of view of the user. The field of view described herein means a field of view when the user faces front, for example. The imager 3 may be configured with two imagers, one of which is disposed near one end portion (corresponding to a right eye side when mounted) of the front surface portion 1a and the other one of which is disposed near the other end portion (corresponding to a left eye side when mounted) of the front surface portion 1a. In this case, the imager disposed near the one end portion (right eye side when mounted) of the front surface portion 1a is able to acquire an image in a range corresponding to a field of view of the right eye of the user. The imager disposed near the other end portion (left eye side when mounted) of the front surface portion 1a is able to acquire an image in a range corresponding to a field of view of the left eye of the user.

The wearable device 1 has a function to visually provide various types of information onto a foreground viewed by the user. The foreground includes scenery in front of the user. In a case where neither the display unit 2a nor the display unit 2b performs display, the wearable device 1 visually provides the user with the foreground through the display unit 2a and the display unit 2b. In a case where the display unit 2a and the display unit 2b respectively perform display, the wearable device 1 visually provides the user with the foreground through the display unit 2a and the display unit 2b, and display contents on the display unit 2a and the display unit 2b.

The front surface portion 1a includes an imager 4 (or also referred to as an in-camera). The imager 4 is arranged on a user's face side in the front surface portion 1a. The imager 4 acquires an image of the face, such as the eyes, of the user.

The front surface portion 1a includes a detector 5. The detector 5 is arranged in the central portion of the front surface portion 1a. The side surface portion 1c includes an operation part 6. The detector 5 and the operation part 6 will be described later.

FIG. 1 illustrates an example in which the wearable device 1 has a shape like a pair of glasses; however, the shape of the wearable device 1 is not limited thereto. For example, the wearable device 1 may have a shape of a pair of goggles. The wearable device 1 may be configured so as to be connected in a wired or wireless manner to an external device, such as an information processing device or a battery device.

Figure 2:
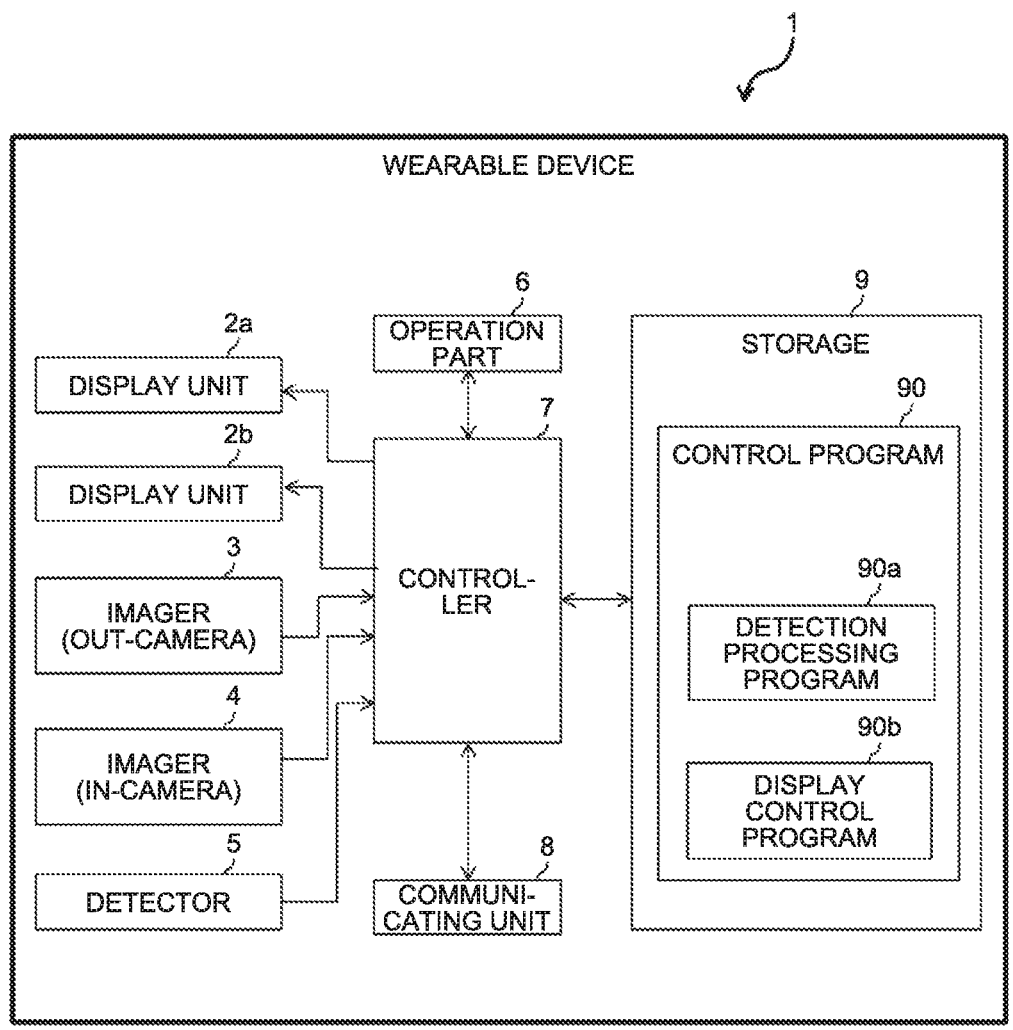
FIG. 2 is a block diagram of the wearable device.

A functional configuration of the wearable device 1 will be described below with reference to FIG. 2. FIG. 2 is a block diagram of the wearable device 1. As illustrated in FIG. 2, the wearable device 1 includes the display unit 2a, the display unit 2b, the imager 3, (out-camera), the imager 4 (in-camera), the detector 5, the operation part 6, a controller 7, a communicating unit 8, and a storage 9.

Each of the display unit 2a and the display unit 2b includes a semi-transparent or transparent display device, such as a liquid crystal display or an organic electro-luminescence (EL) panel. The display unit 2a and the display unit 2b respectively display, as images, various types of information according to control signals input from the controller 7. Each of the display unit 2a and the display unit 2b may be a projector that projects an image on the retina of the user using a light source, such as a laser beam. In this case, each of the display unit 2a and the display unit 2b may be configured such that a half mirror is mounted in a lens portion of the wearable device 1 shaped like a pair of glasses and an image emitted from an additionally-provided projector is projected (in the example illustrated in FIG. 1, the display unit 2a and the display unit 2b are respectively illustrated as rectangular half mirrors). The display unit 2a and the display unit 2b may display various types of information in a three-dimensional manner as described above. The display unit 2a and the display unit 2b may display various types of information in front of the user (or at a position separated from the user) as if the information were present. As a method to display information in this manner, for example, any of multi parallax methods such as a frame sequential method, a polarization method, a linear polarization method, a circular polarization method, a top and bottom method, a side by side method, an anaglyph method, a lenticular method, a parallax barrier method, a liquid parallax barrier method, and a two parallax method may be employed.

Each of the imager 3 and the imager 4 electronically captures images using an image sensor, such as a charge coupled device image sensor (CCD) or a complementary metal oxide semiconductor (CMOS). Each of the imager 3 and the imager 4 converts the captured image into a signal and outputs the signal to the controller 7.

The detector 5 detects real objects that are present in the foreground of the user. The detector 5 detects an object that matches an object registered in advance or an object that matches a shape registered in advance among the real objects, for example. Examples of the object registered in advance include a hand and each of fingers and thumb of a human, and include mobile electronic devices such as a smartphone and a watch-type device. Examples of the shape registered in advance include shapes of a hand and each of fingers and thumb of a human, and include shapes of mobile electronic devices such as a smartphone and a watch-type device. The detector 5 may be configured to detect a range (for example, a shape and a size) of a real object in an image based on brightness, saturation, an edge of hue of pixels or the like, even for objects for which shapes are not registered in advance. The real object as described above will be referred to as a predetermined object in this document.

The detector 5 includes a sensor that detects a real object (or also referred to as a predetermined object). The sensor is a sensor that detects a real object using at least one of visible light, infrared light, ultraviolet light, an electric wave, a sound wave, magnetism, and capacitance, for example.

In some embodiments, the imager 3 (out-camera) may serve as the detector 5. That is, the imager 3 analyzes a captured image and detects an object (or also referred to as a predetermined object) within an imaging range.

The operation part 6 includes a touch sensor disposed on the side surface portion 1c, for example. The touch sensor is capable of detecting contact of the user, and accepts basic operations, such as activation, stop, and change of an operation mode, of the wearable device 1 in accordance with a detection result. In some embodiments, an example is illustrated in which the operation part 6 is arranged on the side surface portion 1c; however, the embodiments are not limited thereto. The operation part 6 may be arranged on the side surface portion 1b, or may be arranged on both of the side surface portion 1b and the side surface portion 1c.

The controller 7 includes a central processing unit (CPU) as an arithmetic means, and a memory as a storage means. The controller 7 executes programs using the above-described hardware resources, and implements various functions. Specifically, the controller 7 reads programs and data stored in the storage 9, loads the programs and the data onto the memory, and causes the CPU to execute commands included in the programs loaded on the memory. The controller 7 reads and writes data from and to the memory and the storage 9, and controls operations of the display unit 2a, the display unit 2b, and the like, in accordance with command execution results obtained by the CPU. When the CPU executes the commands, the data loaded on the memory and operations detected via the detector 5 or the like are used as a part of parameters and determination conditions. The controller 7 controls the communicating unit 8 to perform communication with other electronic devices having communication functions.

The communicating unit 8 performs communication in a wireless manner. Examples of a wireless communication standard supported by the communicating unit 8 include a cellular-phone communication standard, such as 2G, 3G, or 4G, and a near field wireless communication standard. Examples of the cellular-phone communication standard include long term evolution (LTE), wideband code division multiple access (W-CDMA), worldwide interoperability for microwave access (WiMAX), CDMA2000, personal digital cellular (PDC), global system for mobile communications (GSM) (registered trademark), and personal handy-phone system (PHS). Examples of the near field wireless communication standard include IEEE802.11, Bluetooth (registered trademark), infrared data association (IrDA), near field communication (NFC), and wireless personal area network (WPAN). Examples of the WPAN communication standard include ZigBee (registered trademark). The communicating unit 8 may support one or a plurality of the above-described communication standards.

For example, when the wearable device 1 is mounted on a user, the wearable device 1 may transmit and receive various signals by performing communication using the above-described near-field wireless communication method with a mobile electronic device (for example, a smartphone, a watch-type device, or the like) carried by the user.

The communicating unit 8 may perform communication by being connected in a wired manner to another electronic device, such as the above-described mobile electronic device. In this case, the wearable device 1 includes a connector to which the another electronic device is connected. The connector may be a general-purpose terminal, such as a universal serial bus (USB), a high-definition multimedia interface (HDMI) (registered trademark), a light peak (Thunderbolt (registered trademark)), or an earphone microphone connector. The connector may be a dedicated terminal, such as a Dock connector. The connector may be connected to any devices including, for example, an external storage, a speaker, and a communication device, in addition to the above-described mobile electronic devices.

The storage 9 stores therein various programs and data. The storage 9 may include a non-volatile storage device, such as a flash memory. The programs stored in the storage 9 include a control program 90. The storage 9 may be configured by a combination of a portable storage medium, such as a memory card, and a reading/writing device that performs read and write from and to the storage medium. In this case, the control program 90 may be stored in the storage medium. The control program 90 may be acquired from a server device or another mobile electronic device, such as a smartphone or a watch-type device, by wireless communication or wired communication.

The control program 90 provides functions related to various types of control for operating the wearable device 1. The functions provided by the control program 90 include a function to detect a real object (predetermined object) that is present in scenery in front of the user from a detection result of the detector 5, a function to control displays of the display units 2a and 2b, and the like.

The control program 90 includes a detection processing program 90a and a display control program 90b. The detection processing program 90a provides a function to detect a predetermined object that is present in the foreground of the user from the detection result of the detector 5. The detection processing program 90a provides a function to estimate a position of the predetermined object in the foreground of the user from the detection result of the detector 5. The detection processing program 90a provides a function to detect a predetermined object that is present in the scenery in front of the user from the detection result of the imager 3. The display control program 90b provides a function to display information related to the predetermined object that is present in the scenery in front of the user. When the predetermined object is an electronic device with a display function, such as a smartphone or a watch-type device, and when the electronic device performs predetermined display, the display control program 90b provides a function to display additional information related to the display on the display unit.

Figure 3A:
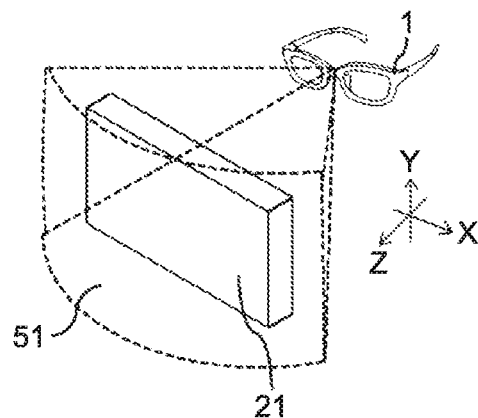
FIG. 3A is a diagram for explaining a relationship between a detection range of a detector and a display region of a display unit.
Figure 3B:
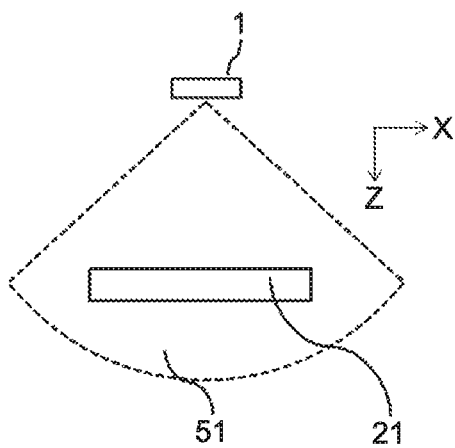
FIG. 3B is a diagram for explaining the relationship between the detection range of the detector and the display region of the display unit.
Figure 3C:
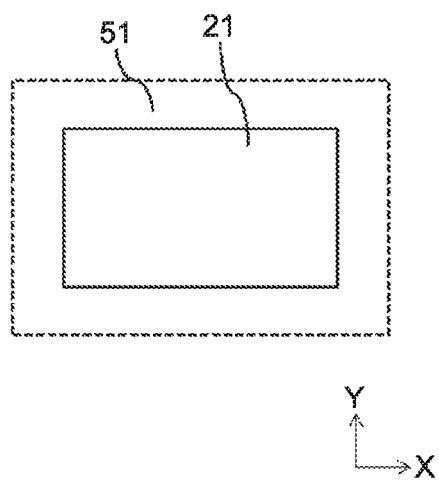
FIG. 3C is a diagram for explaining the relationship between the detection range of the detector and the display region of the display unit.

A relationship between a detection range of the detector 5 and a display region of the display unit 2a and the display unit 2b will be described below with reference to FIG. 3A to FIG. 3C. FIG. 3A to FIG. 3C are diagrams illustrating a relationship between a detection range 51 of the detector 5 and a display region 21 of the display unit 2a and the display unit 2b.

In some embodiments, explanation will be given on the assumption that the detector 5 is a sensor that detects a real predetermined object using infrared light. The explanation will be given on the assumption that the detector 5 includes an infrared emitter that emits infrared light and an infrared imager capable of receiving infrared light reflected from a real predetermined object (or having sensitivity to infrared light). That is, the controller 7 detects a real predetermined object from an image captured by the infrared imager. In some embodiments, the explanation will be given on the assumption that display images are displayed as if the display unit 2a and the display unit 2b were present at the positions separated from the wearable device 1.

FIG. 3A is a perspective view schematically illustrating the detection range 51 of the detector 5 and the display region 21 of the display unit 2a and the display unit 2b. FIG. 3B is a top view of FIG. 3A. FIG. 3C is a front view of FIG. 3A. In FIG. 3A to FIG. 3C, a three-dimensional Cartesian coordinate system with the X-axis, the Y-axis, and the Z-axis is defined. The Y-axis direction is a vertical direction. The Z-axis direction is a front and back direction of the user. The X-axis direction is a direction perpendicular to both of the Y-axis direction and the Z-axis direction. FIG. 3C corresponds to a field of view when the user views the front.

As can be found from FIG. 3A to FIG. 3C, the detection range 51 has a three-dimensional space. That is, the detector 5 is able to detect a predetermined object that is present in the detection range 51 of a three-dimensional space, by causing the infrared imager to detect infrared light emitted from the infrared emitter. The detector 5 is also able to detect a behavior of a predetermined object that is present in the detection range 51 of a three-dimensional space. For example, when the predetermined object is an arm, a hand, or a finger of the user or a combination thereof (collectively referred to as an upper limb), the detector 5 is able to detect, as a behavior, a bending behavior/stretching behavior of a finger, bending of a wrist, rotation of a forearm (for example, pronation or supination), or the like (also referred to as a gesture). The detector 5 may detect that a position of a specific portion in the upper limb moves within the detection range 51. The detector 5 may detect a shape of the upper limb. For example, the detector 5 may detect such a form as a closed fist held with the thumb extended upward (for example, a thumbs-up sign), or the like.

Even when the imager 3 (out-camera) is applied as the detector, the wearable device 1 can detect a predetermined object that is present in the detection range (or in the imaging range), a behavior of the predetermined object, and the like, similarly to the above-described detector 5.

As can be seen in FIG. 3A to FIG. 3C, the display unit 2a and the display unit 2b display images in the display region 21 that is located apart from the wearable device 1, rather than in an actually-mounted portion on the wearable device 1 (hereinafter, an image displayed by the display units 2a and 2b may be referred to as a display image). In this case, the display unit 2a and the display unit 2b may display the display image as a three-dimensional object in a solid shape with a depth. The depth corresponds to a thickness in the Z-axis direction.

(1. A Network System 100 Configured by the Wearable Device 1 and Another Electronic Device (See FIG. 4))

Figure 4:
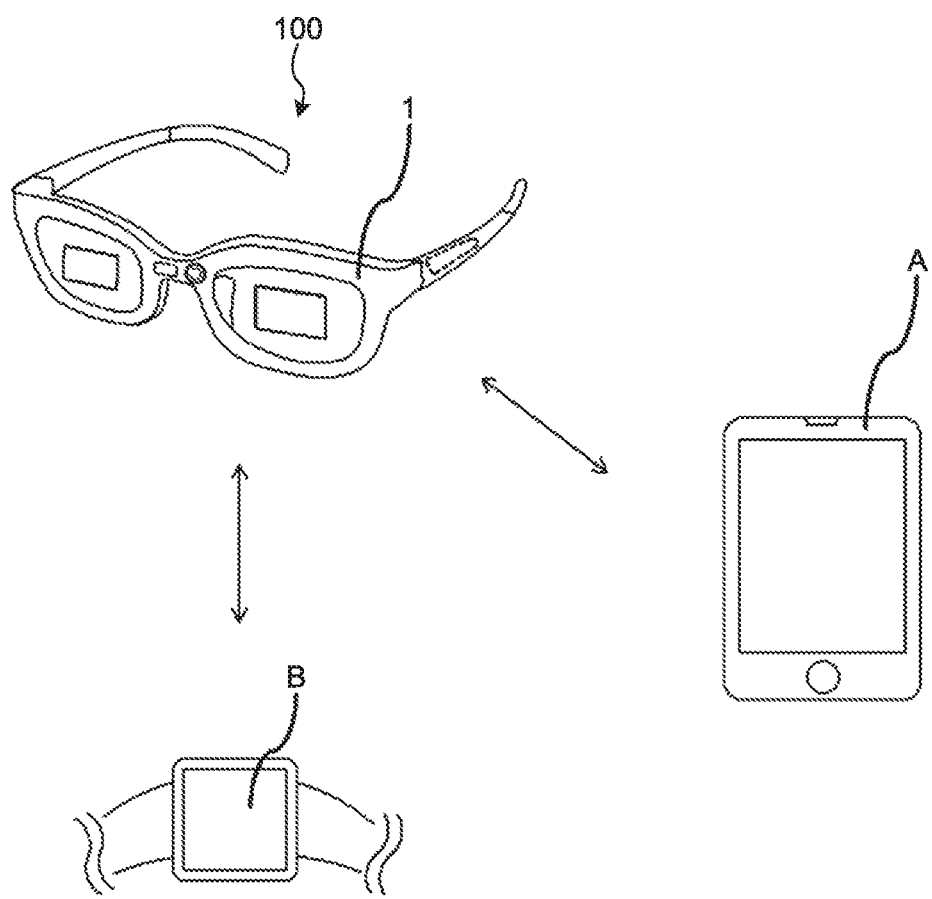
FIG. 4 is a schematic diagram of a network system configured by the wearable device and another electronic device.

FIG. 4 is a schematic diagram of the network system 100 configured by the wearable device 1 and another electronic device. As illustrated in FIG. 4, the wearable device 1 communicates with another electronic device, such as a smartphone A carried by a user or a watch-type device B mounted on an arm of a user, through wireless or wired connection to the another electronic device. The wearable device 1 causes the controller 7 to control the communicating unit 8 to perform communication with the another electronic device. When the wearable device 1 is able to communicate with a plurality of electronic devices (for example, the smartphone A and the watch-type device B), the wearable device 1 may identify a communication partner based on identification information (for example, data indicating an ID) included in a signal transmitted from any of the electronic devices.

The network system 100 realizes execution of a first function in which the wearable device 1 notifies a user of information instead of the another electronic device that will notify the user of the information. For example, the wearable device 1 can respectively display images on the display unit 2a and the display unit 2b of the wearable device 1 instead of another electronic device that will display the images. As a concrete example, if the smartphone A as another electronic device receives an electronic mail, the smartphone A transmits a control signal for displaying information indicating that the electronic mail has been received or a control signal for displaying contents of the electronic mail (for example, message or the like) to the wearable device 1. The wearable device 1 that has received the control signal displays the information indicating that the smartphone A has received the electronic mail or the contents of the electronic mail on the display unit 2a and the display unit 2b based on the control signal, respectively.

The network system 100 realizes a second function to operate the wearable device 1 based on a contact operation performed on another electronic device carried by a user. For example, when the another electronic device is the smartphone A on which a contact operation is available, the wearable device 1 may receive a signal including information on contact with the another electronic device from the smartphone A, and may perform an operation including a change of display or the like based on the signal.

When the another electronic device is the watch-type device B capable of detecting a behavior of the upper limb on which the watch-type device B is mounted, the wearable device 1 may receive a signal that is based on the detected behavior of the upper limb from the watch-type device B, and may perform an operation including a change of display or the like based on the signal.

The network system 100 realizes a third function in which the wearable device 1 displays additional information related to display of a display function on the display unit 2a and the display unit 2b of the wearable device 1 respectively, when another electronic device has the display function. For example, when another electronic device is the smartphone A, the wearable device 1 may receive a signal related to display control from the smartphone A, and may display an image based on the signal in a space that can be viewed by a user.

Figure 5:
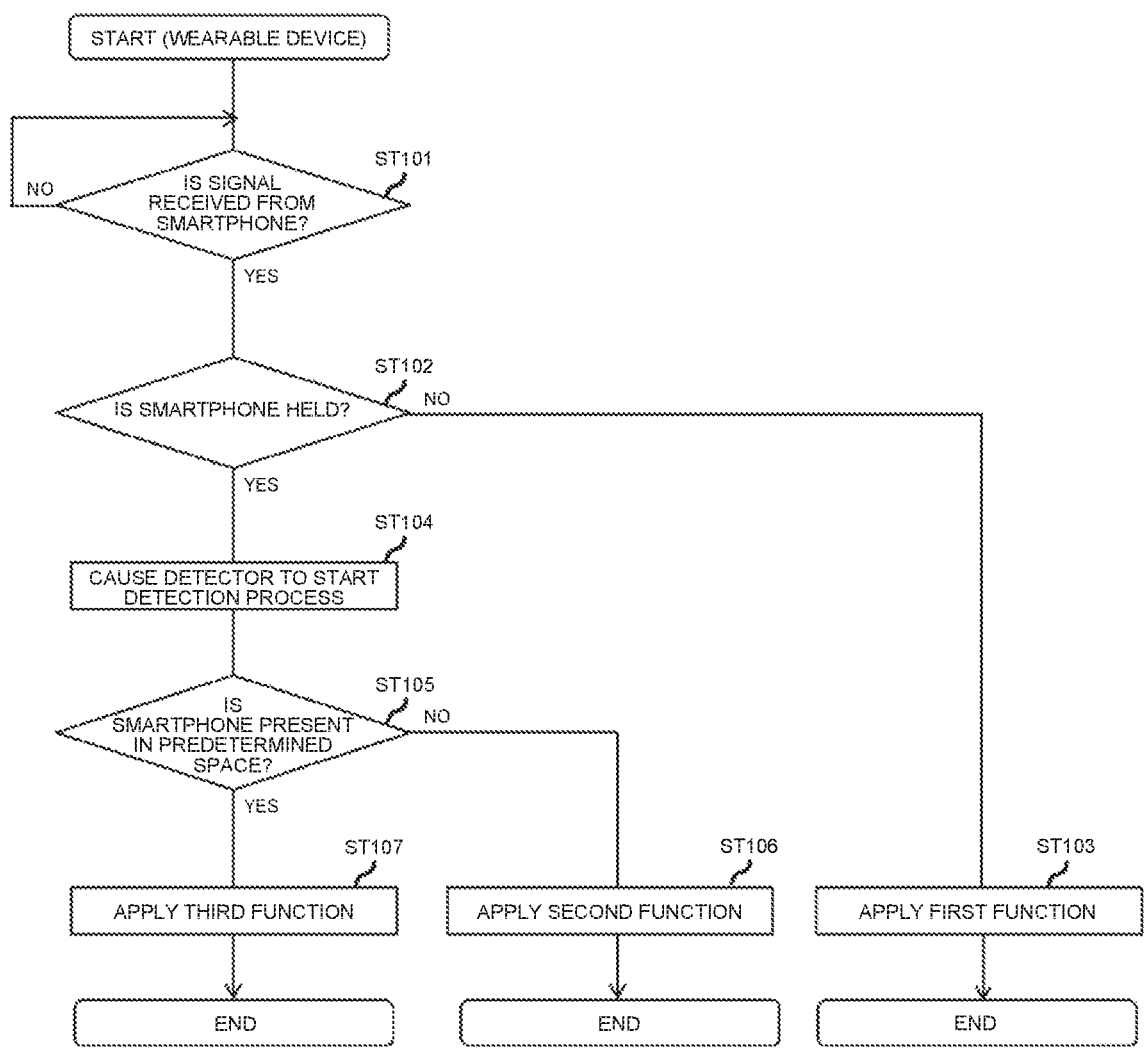
FIG. 5 is a diagram illustrating an example of a determination flow for applying any of various functions by the wearable device.

Various functions realized by the network system 100 have been described above. The various functions may be appropriately selected and executed based on conditions determined in advance. FIG. 5 is a diagram illustrating an example of a determination flow for applying any of various functions by the wearable device 1. A process based on the determination flow is implemented by causing the controller 7 of the wearable device 1 to execute the control program 90 stored in the storage 9. In the example illustrated in FIG. 5, explanation will be given on the assumption that another electronic device is the smartphone A.

As illustrated in FIG. 5, the controller 7 determines whether a signal is received from the smartphone A (Step ST101).

As a result of the determination, if the signal is not received from the smartphone A (NO at Step ST101), the controller 7 repeats the determination. In contrast, if the signal is received from the smartphone A (YES at Step ST101), the controller 7 determines whether the smartphone A is held by a user from information that is based on the received signal (Step ST102).

As a result of the determination, if determining that the smartphone A is not held by the user (NO at Step ST102), the controller 7 applies the first function realized by the network system 100 (Step ST103). The first function includes a function in which the wearable device 1 notifies the user of information instead of the another electronic device that is the smartphone A that will notify the user of the information.

As a result of the determination at Step ST102, if recognizing that the smartphone A is held by the user (YES at Step ST102), the controller 7 causes the detector 5 to start a detection process (Step ST104).

Subsequently, the controller 7 determines whether the smartphone A is present in a predetermined space in front of the user from a detection result of the detector 5 (Step ST105). The predetermined space in front of the user is, for example, a space that can be viewed by the user. In this case, the space that can be viewed by the user may be appropriately defined; for example, the space may be defined based on the fact that a normal viewing angle of a human is about 120 degrees. The predetermined space in front of the user may be a space that can be viewed by a user such that the space overlaps with the display region 21 when the user views the display region 21 while the wearable device 1 is mounted on the user. The predetermined space may be defined in arbitrary ways, other than the above-described examples.

As a result of the determination, if the smartphone A is not present in the predetermined space (NO at Step ST105), the controller 7 applies the second function realized by the network system 100 (Step ST106). The second function includes a function to operate the wearable device 1 based on a contact operation performed on the smartphone A, for example.

In this manner, the wearable device 1 may have a configuration to determine whether the smartphone A is held by the user, and enable execution of the function to operate the wearable device 1 based on a contact operation performed on the smartphone A when the smartphone A is held by the user. The wearable device 1 may have a configuration to recognize that the user may not immediately view the smartphone A if the smartphone A is not held by the user, and enable execution of the function in which the wearable device 1 notifies the user of information instead of the smartphone A that will notify the user of the information. With these configurations, the wearable device 1 can execute a more convenient function depending on the usage state of the smartphone A.

As a result of the determination, if the smartphone A is present in the predetermined space (YES at Step ST105), the controller 7 applies the third function realized by the network system 100 (Step ST107). The third function includes a function to display, on the display unit 2a and the display unit 2b of the wearable device 1, additional information related to display contents displayed by the smartphone A, for example.

In this manner, the wearable device 1 may be configured to determine whether the smartphone A is present in a predetermined space (for example, a space that can be viewed by the user), and enable execution of the function to display, on the display unit 2a and the display unit 2b, additional information that complements display contents displayed by the smartphone A if the smartphone A is present in the predetermined space. The wearable device 1 may be configured to recognize that the user is not viewing the smartphone A if the smartphone A is not present in the predetermined space (for example, a space that can be viewed by the user), and enable execution of the function to operate the wearable device 1 in accordance with a contact operation performed on the smartphone A. With these configurations, the wearable device 1 can execute a more convenient function depending on the usage state of the smartphone A. In a case where the wearable device 1 is operated in accordance with a contact operation performed on the smartphone A, when the smartphone A includes a touch panel, the wearable device 1 may execute a function as a cursor to specify a position of a display region (an X-Y plane in FIG. 3) of the wearable device 1 based on movement of a contact position on the touch panel.

Figure 6:
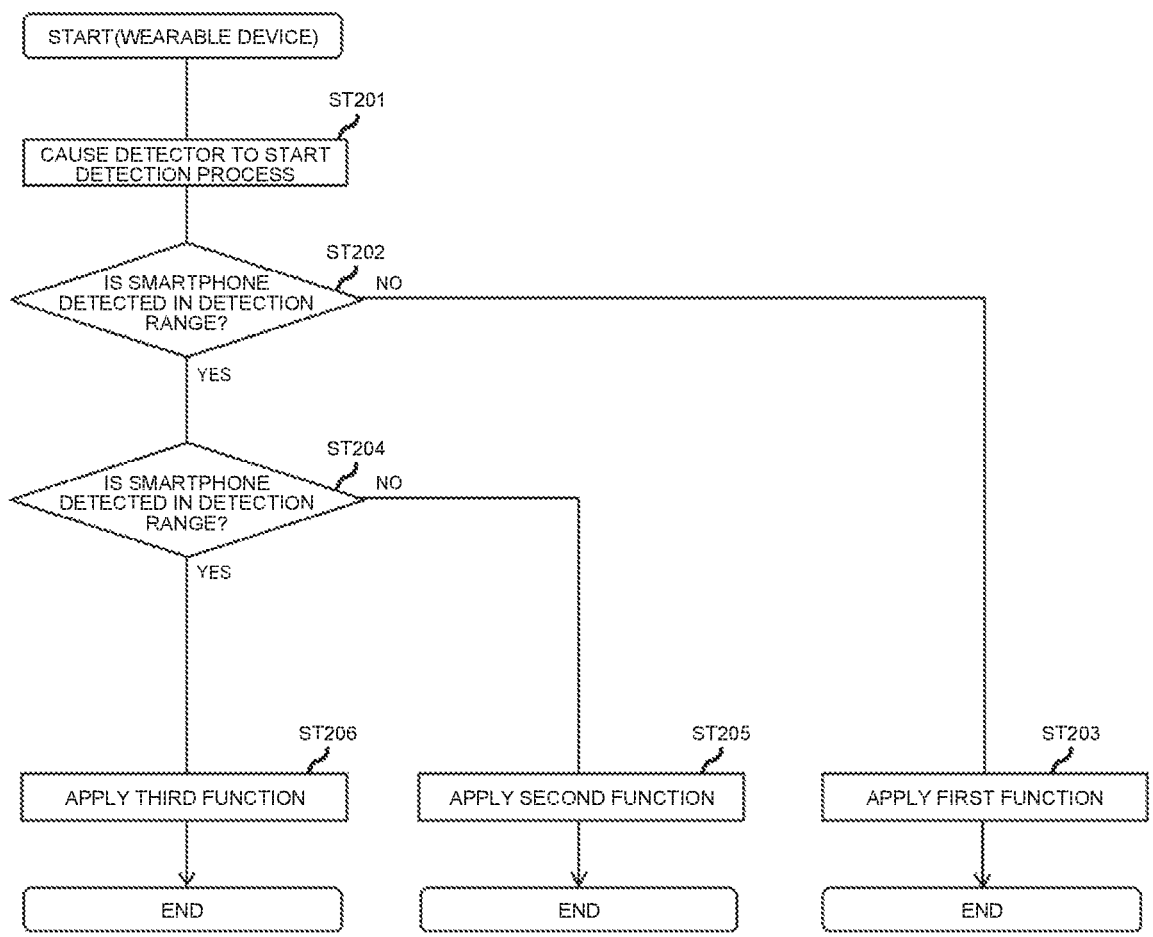
FIG. 6 is a diagram illustrating another example different from the example illustrated in FIG. 5, with respect to the determination flow for applying any of various functions by the wearable device.

FIG. 6 is a diagram illustrating another example different from the example illustrated in FIG. 5, with respect to the determination flow for applying any of various functions by the wearable device 1. A process based on the determination flow is implemented by causing the controller 7 of the wearable device 1 to execute the control program 90 stored in the storage 9. In the example illustrated in FIG. 6, explanation will be given on the assumption that another electronic device is the smartphone A.

As illustrated in FIG. 6, the controller 7 causes the detector 5 to start a detection process (Step ST201).

Subsequently, the controller 7 determines whether the smartphone A is present in the detection range 51 from a detection result of the detector 5 (Step ST202).

As a result of the determination, if the smartphone A is not present in the detection range 51, that is, if the detector 5 does not detect the smartphone A (NO at Step ST202), the controller 7 applies the first function realized by the network system 100 (Step ST203). The first function includes a function in which the wearable device 1 notifies the user of information instead of the another electronic device that is the smartphone A that will notify the user of the information.

As a result of the determination at Step ST202, if the smartphone A is present in the detection range 51, that is, if the detector 5 detects the smartphone A (YES at Step ST202), the controller 7 causes the process to proceed to Step ST204. The controller 7 determines whether the smartphone A is present in a predetermined space in front of the user (Step ST204). The predetermined space may be defined in the same manner as in FIG. 5.

As a result of the determination, if the smartphone A is not present in the predetermined space (NO at Step ST204), the controller 7 applies the second function realized by the network system 100 (Step ST205). The second function includes a function to operate the wearable device 1 based on a contact operation performed on the smartphone A, for example.

As a result of the determination, if the smartphone A is present in the predetermined space (YES at Step ST204), the controller 7 applies the third function realized by the network system 100 (Step ST206). The third function includes a function to display, on the display unit 2a and the display unit 2b of the wearable device 1, additional information related to display contents displayed by the smartphone A, for example.

As illustrated in FIG. 5 and FIG. 6, the wearable device 1 is able to appropriately apply various functions realized by the network system 100 based on various conditions that may be set appropriately. However, the wearable device 1 according to some embodiments is not limited to the configurations as described above. Application of the above-described various functions may be set appropriately by the user. The wearable device 1 does not necessarily have to include all of the above-described functions.

(2. Functions to Display Additional Information Related to Display Contents of Another Electronic Device on the Wearable Device 1)

Embodiments of the functions to display, on the wearable device 1, additional information related to display contents of another electronic device will be described below with reference to FIG. 7 to FIG. 20.

Figure 7:
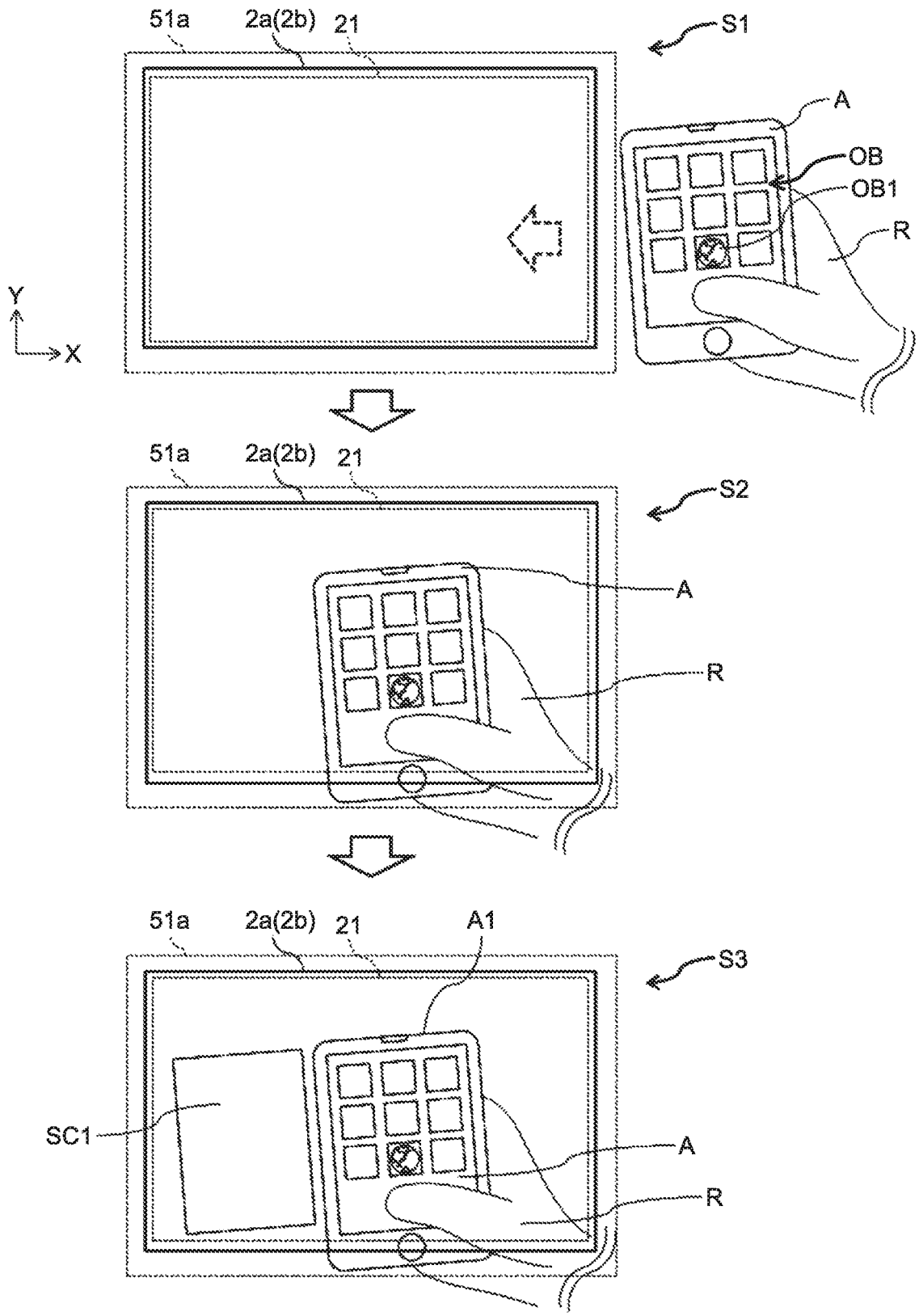
FIG. 7 is a diagram illustrating a first example of a process performed by the wearable device according to some embodiments.

FIG. 7 is a diagram illustrating a first example of a process performed by the wearable device 1 according to some embodiments.

FIG. 7 illustrates the display unit 2a (2b) (hereinafter, may be simply described as the display unit 2) of the wearable device 1. Illustrations of other members and other functional units of the wearable device 1 except for the display unit 2a are omitted. FIG. 7 is a diagram schematically illustrating, as a two-dimensional plane, a space corresponding to a field of view of a user. FIG. 7 illustrates the display region 21 of the display unit 2, and a predetermined space 51a that is located in front of the user and that is detectable by the detector 5 (in the example in FIG. 7, a region enclosed by dotted lines). The predetermined space 51a may be defined in various ways as described above. The predetermined space in front of the user means a predetermined space in front of the wearable device 1. The predetermined space 51a is illustrated as if it were a plane in FIG. 7; however, in reality, the predetermined space 51a is defined as a three-dimensional space with a depth in the front and back direction of the user (for example, in the Z-axis direction in FIG. 3). It is assumed that the wearable device 1 has activated the detector 5 and a predetermined object in the detection range 51 (not illustrated) is detectable.

FIG. 7 also illustrates the smartphone A (another electronic device) held by a right hand R of the user. The smartphone A includes a display unit and a touch sensor provided so as to overlap with the display unit. The smartphone A is able to perform a process based on an image displayed at a predetermined position in a display region of the display unit when the predetermined position is touched.

At Step S1, a plurality of objects OB (also referred to as icons) for executing predetermined functions when touched are displayed on the smartphone A (such a screen may be referred to as a home screen). The plurality of objects OB include an object OB1. For example, the object OB1 is an image indicating that a web browser can be activated when touched. At Step S1, the smartphone A is present outside the predetermined space 51a. In this state, if the user moves the right hand to the left, the smartphone A moves to the inside of the predetermined space 51a as illustrated at Step S2. It is assumed that the smartphone A is present inside the predetermined space 51a even in the Z-axis direction of the user (in other words, in the direction perpendicular to the X-Y plane).

If the detector 5 detects that the smartphone A is present in the predetermined space 51a in front of the user, the wearable device 1 starts a communication connection to the smartphone A. The wearable device 1 receives, from the smartphone A, a display control signal for performing predetermined display on the display unit 2 of the wearable device 1. The wearable device 1 displays a new screen SC1 on the display unit 2 based on the received display control signal (Step S3). The screen SC1 includes additional information related to display contents that had been displayed at the time of detecting that the smartphone A was present within the predetermined space 51a, for example. In the example in FIG. 7, the smartphone A is displaying a home screen; therefore, the screen SC1 may display, as the additional information, information for explaining functions of the objects OB (icons) in the home screen, memorandums made in advance by the user, or the like, for example.

In this manner, the wearable device 1 includes the detector 5 that detects whether the smartphone A (another electronic device) is present in the predetermined space 51a in front of the wearable device. The wearable device 1 has a configuration to display, on the display unit 2, additional information related to predetermined display if the smartphone A is present in the predetermined space 51a and the smartphone A performs the predetermined display. With this configuration, the wearable device 1 can provide the user with a greater amount of information than images that can be displayed by the smartphone A at one time, that is, a greater amount of information than the amount of information that can be provided to the user at one time; therefore, usability for the user can be improved.

In the above-described explanation with reference to FIG. 7, a configuration has been described in which the wearable device 1 starts a communication connection to the smartphone A upon detecting that the smartphone A is present in the predetermined space 51a; however, the embodiments are not limited thereto. For example, the wearable device 1 may be triggered upon detecting that the smartphone A is held by the user. Whether the smartphone A is held by the user may be detected by the touch sensor included in the smartphone A, for example. The wearable device 1 may be configured to start a communication connection upon receiving a communication connection request to the wearable device 1 from the smartphone A.

In the above-described explanation with reference to FIG. 7, the wearable device 1 is configured to display the screen SC1 if a state in which the entire smartphone A is present outside the predetermined space 51a is changed to a state in which the entire smartphone A is present inside the predetermined space 51a; however, the embodiments are not limited to this configuration. The wearable device 1 may determine that the smartphone A is present in the predetermined space 51a when a ratio of a region of the smartphone A occupying the predetermined space 51a to the whole region of the smartphone A becomes a predetermined value or more. Alternatively, the wearable device 1 may determine that the smartphone A is present in the predetermined space 51a if only a small part of the smartphone A is detected in the predetermined space 51a.

The wearable device 1 may detect that the smartphone A is present in the predetermined space 51a in a state in which a display surface of the smartphone A and a front surface of the wearable device 1 (or a display surface of the wearable device 1) intersect at an angle that is less than a predetermined angle. The wearable device 1 may be configured to determine that "the smartphone A is present in the predetermined space 51a in front of the user" based on such detection, and to display the screen SC1.

The wearable device 1 may detect that the smartphone A is present in the predetermined space 51a in a state in which a line-of-sight direction of the user, which is specified from images of the eyes of the user captured by the imager 4 (in-camera), and the display surface of the smartphone A intersect at an angle greater than a predetermined angle. The wearable device 1 may be configured to determine that "the smartphone A is present in the predetermined space 51a in front of the user" based on such detection, and to display the screen SC1.

The controller 7 may extract a predetermined region including the eyeball of the user from an image of the user captured by the imager 4, and specify the line-of-sight direction based on a positional relationship between the inner corner and the iris of the user's eye. Alternatively, the controller 7 respectively stores, as reference images, a plurality of images of the eyeballs when the user views each of portions in the display region on the display. The controller 7 may detect the above-described line-of-sight position by checking the reference images against images of the eyeballs of the user acquired as determination targets.

The wearable device 1 may determine that the smartphone A is present in the predetermined space 51a upon detecting the wearable device 1, the face of the user, or the eyes of the user in a captured image captured by an imager included in the smartphone A, for example. In this case, the smartphone A includes the imager exposed on a surface parallel to the display surface (or on the same surface as the display surface), and recognizes that the user is viewing the display surface of the smartphone A when detecting the wearable device 1 (or the face or the eyes of the user) in the captured image. The smartphone A starts a communication connection to the wearable device 1 upon detecting the wearable device 1 (or the face or the eyes of the user) in the captured image. The wearable device 1 recognizes that the smartphone A is present in the predetermined space 51a based on a signal received from the smartphone A, and displays the screen SC1.

A configuration has been described in which the wearable device 1 performs a communication connection to the smartphone A (another electronic device) and displays the screen SC1 (additional information) based on the display control signal received from the smartphone A; however, the embodiments are not limited thereto. For example, the wearable device 1 may have a configuration to store the additional information related to the display contents of the smartphone A in the storage 9 in advance, detect the display contents of the smartphone A that is present in the predetermined space 51a from a captured image of the imager 3 or the like, refer to the additional information related to the display contents from the storage 9, and display the additional information as the screen SC1.

The wearable device 1 is configured to display the screen SC1 based on detection of the smartphone A (another electronic device) in the predetermined space 51a; however, the embodiments are not limited thereto. For example, the wearable device 1 may be configured to display the screen SC1 based on detection of the right hand R holding the smartphone A (another electronic device) in the predetermined space 51a.

The wearable device 1 may hide other screens that are displayed on the display unit 2 when displaying the screen SC1. In other words, the wearable device 1 may have a configuration to hide an image that has been displayed on the display unit 2 in a first state, upon transition from the first state in which the smartphone A (another electronic device) is not present in the predetermined space 51a to a second state in which the smartphone A is present in the predetermined space 51a.

As illustrated in FIG. 7, the screen SC1 is displayed on the outside of an outline A1 of an approximate rectangular shape of the smartphone A. In this manner, the wearable device 1 detects the outline A1 of the smartphone A (another electronic device) in the predetermined space 51a based on a detection result of the detector 5, and displays the screen SC1 (for example, an image including the additional information) on the display unit 2 such that the screen SC1 is located outside the outline A1 of the smartphone A. With this configuration, the wearable device 1 prevents the screen SC1 from interfering with viewing of display of the smartphone A; therefore, usability can be improved.

As illustrated in FIG. 7, the screen SC1 is arranged and displayed such that one side of the screen SC1 is aligned approximately parallel to one side of the smartphone A. With this configuration, the wearable device 1 can easily recognize that the additional information included in the screen SC1 is information related to the display contents of the smartphone A.

The wearable device 1 may associate space coordinates of the display region 21 with space coordinates of the predetermined space 51a in advance. With this configuration, the wearable device 1 can display the screen SC1 with an appropriate shape, an appropriate size, and an appropriate angle at an appropriate position as described above, based on the position and the angle of the smartphone A in the predetermined space 51a.

Figure 8:
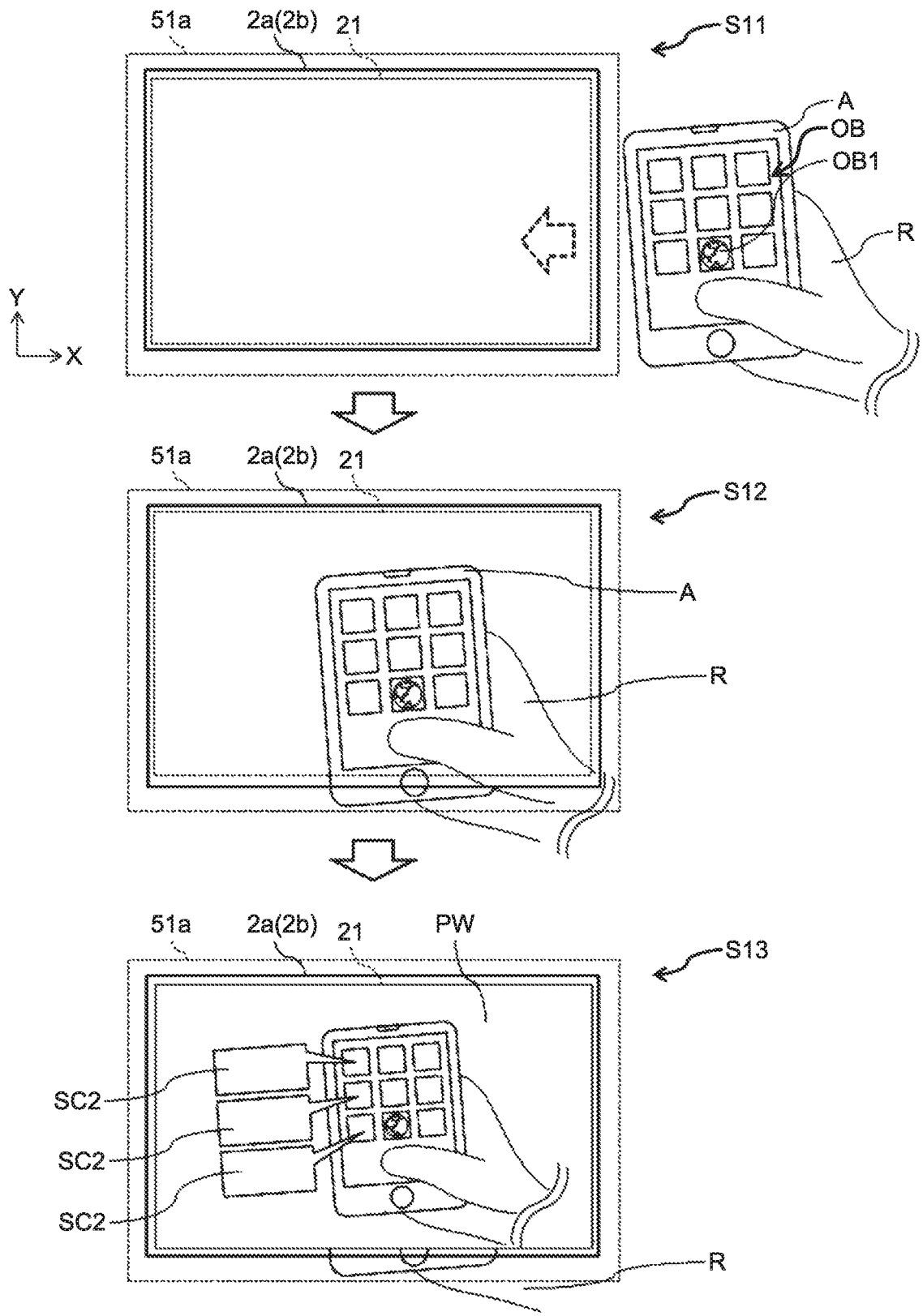
FIG. 8 is a diagram illustrating a second example of the process performed by the wearable device according to some embodiments.

FIG. 8 is a diagram illustrating a second example of the process performed by the wearable device 1 according to some embodiments.

At Step S11, a plurality of objects OB are displayed on the smartphone A. The plurality of objects OB include the object OB1 indicating that a web browser can be activated, for example. At Step S11, the smartphone A is present outside the predetermined space 51a. In this state, if the user moves the right hand to the left, the smartphone A moves to the inside of the predetermined space 51a as illustrated at Step S12.

Upon detecting that the smartphone A is present in the predetermined space 51a in front of the user, the wearable device 1 activates the imager 3 (out-camera). The wearable device 1 displays a captured image captured by the imager 3 on the display unit 2 (Step S13). The captured image displayed on the display unit 2 will be referred to as a preview window PW. The preview window PW includes video data configured by sequentially transmitting images captured by the imager 3.

Upon detecting that the smartphone A is present in the predetermined space 51a in front of the user, the wearable device 1 starts a communication connection to the smartphone A, and receives a display control signal for performing predetermined display on the display unit 2 of the wearable device 1 from the smartphone A. The wearable device 1 displays a plurality of screens SC2 so as to overlap with the preview window PW on the display unit 2 based on the received display control signal (Step S13). Each of the screens SC2 includes additional information related to display contents that had been displayed at the time of detecting that the smartphone A was present in the predetermined space 51a. Each of the screens SC2 includes information for explaining functions of the objects OB, for example. Each of the screens SC2 is displayed as an image with a balloon portion that starts from each of the objects OB corresponding to the additional information included in each.

With this display mode, when a plurality of pieces of additional information are displayed, the wearable device 1 can easily recognize correspondence between the pieces of additional information and a plurality of display contents displayed by the smartphone A.

The wearable device 1 can also recognize the smartphone A and display contents displayed by the smartphone A in the preview window PW. Therefore, the wearable device 1 is able to display the screens SC2 such that start points of the balloon portions of the screens SC2 match the display positions of the objects OB in the preview window PW. With this configuration, the wearable device 1 can reliably associate the positions of the objects OB with the positions of the screen SC2.

Figure 9:
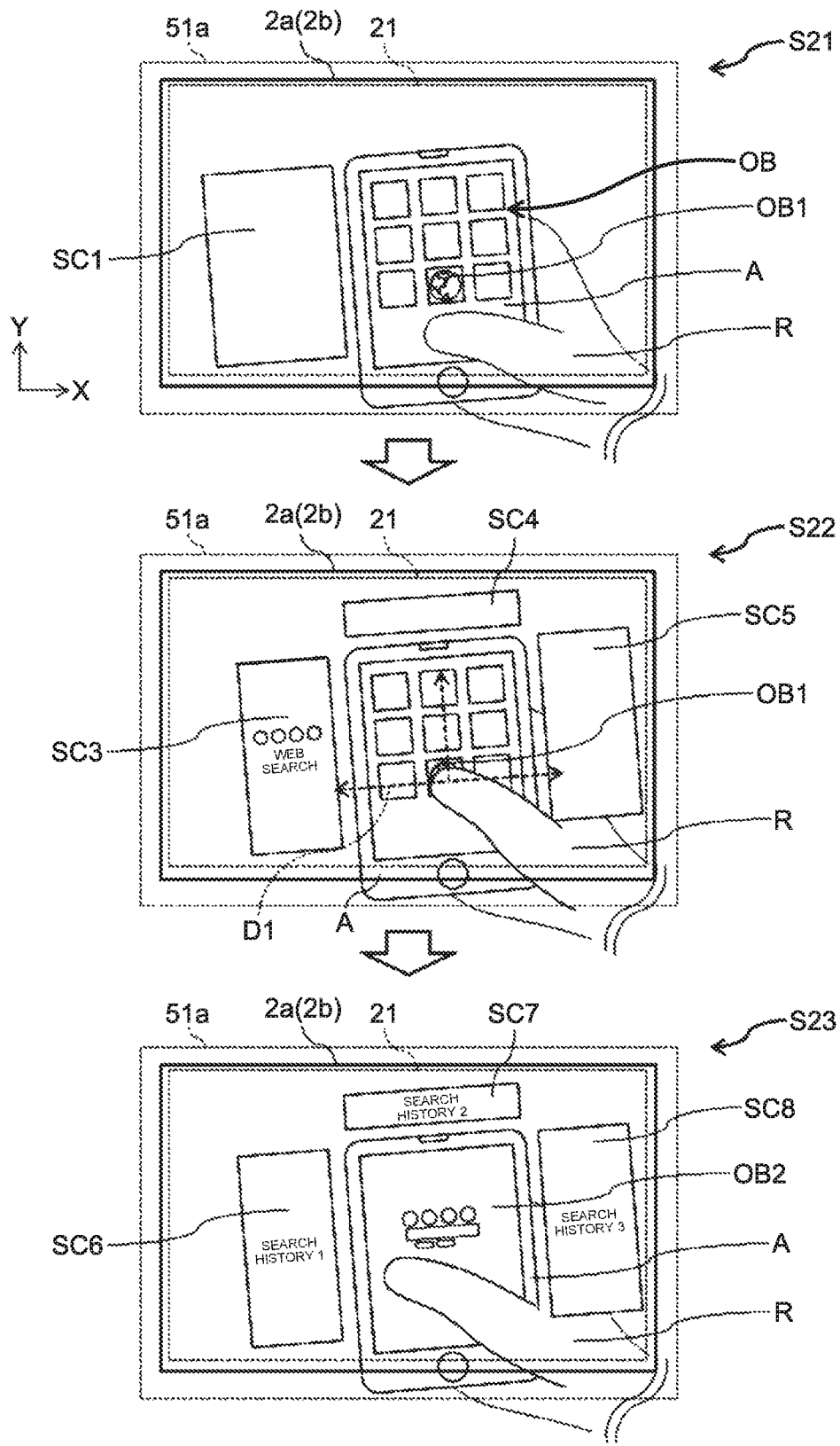
FIG. 9 is a diagram illustrating a third example of the process performed by the wearable device according to some embodiments.

FIG. 9 is a diagram illustrating a third example of the process performed by the wearable device 1 according to some embodiments.

A state at Step S21 is the same as the state at Step S3 illustrated in FIG. 7. In the state at Step S21, the smartphone A is present inside the predetermined space 51a and additional information related to the object OB displayed by the smartphone A is displayed as the screen SC1 on the display unit 2.

At Step S21, the thumb of the right hand R of the user holding the smartphone A is located in a portion in which the object OB is not displayed on the display surface of the smartphone A. In this state, when the thumb of the right hand R touches a position in which the object OB1 indicating a web browser function is displayed, the wearable device 1 displays screens SC3 to SC5 instead of the screen SC1 as illustrated at Step S22.

The screens SC3 to SC5 displayed at Step S22 include a plurality of web pages related to the object OB1 (for example, images related to the web browser function). The plurality of web pages may be a plurality of web pages that had been actually opened upon execution of browser applications, for example. The plurality of web pages may be a plurality of web pages that are registered (or bookmarked) by the user in advance, for example. For example, the screen SC3 displays a "search page" that is registered by the user in advance.

At Step S22, upon detecting that the smartphone A is present in the predetermined space 51a, the wearable device 1 starts a communication connection to the smartphone A and receives the display control signal from the smartphone A. Meanwhile, upon establishing the communication connection to the wearable device 1, the smartphone A detects a contact position of the right hand of the user on the display screen. The smartphone A generates and transmits the display control signal for displaying information related to the web browser function on the wearable device 1 based on the fact that the contact position corresponds to the display position of the object OB1 (web browser function).

In this manner, the wearable device 1 can display different types of additional information on the display unit 2 depending on the contact position of the user on the display screen of the smartphone A (another electronic device). With this configuration, the wearable device 1 can provide the user with information appropriate for an operating state on the smartphone A as the additional information; therefore, usability can be improved.

The display control signal received from the smartphone A may include a display direction of the additional information. In the example illustrated in FIG. 9, the display control signal includes a signal for controlling the screen SC3 to be displayed leftward with respect to the smartphone A, controlling the screen SC4 to be displayed upward with respect to the smartphone A, and controlling the screen SC5 to be displayed rightward with respect to the smartphone A. The wearable device 1 displays the screen SC3 on the left side of the smartphone A, displays the screen SC4 on the upper side of the smartphone A, and displays the screen SC5 on the right side of the smartphone A based on the received display control signal as illustrated at Step S22.

At Step S22, the thumb of the right hand R of the user remains in touch with the object OB1 (web browser function) displayed on the smartphone A. In this state, if the thumb of the right hand R is released from the display position of the object OB1, the smartphone A activates the web browser function and shifts the display to a predetermined web page (also referred to as a first process). Meanwhile, if the smartphone A detects an operation of moving the contact position (in other words, sliding) in a direction toward any of the screens SC3 to SC5 displayed by the wearable device 1 (for example, in directions of dotted arrows at Step S22) from the state in which the thumb of the right hand R is in touch with the display position of the object OB1, the smartphone A may perform a process different from the above-described first process. For example, the smartphone A detects an operation of moving the contact position in a direction D1 (leftward direction) toward the screen SC3 displayed by the wearable device 1 from a state in which the thumb of the right hand R is in contact with the display position of the object OB1. In this case, the smartphone A activates the web browser function and shifts to a "search page (OB2)" that is different from the above-described predetermined web page and that is displayed as the screen SC3 (Step S23).

As illustrated at Step S23, when the display shifts to the "search page", the smartphone A transmits a display control signal related to the "search page" to the wearable device 1. The wearable device 1 displays, as screens SC6 to SC8, additional information related to the "search page" (for example, web pages related to past search histories 1 to 3) based on the received display control signal.

In this manner, as described above based on the third example, the display control signal received from the smartphone A includes a display direction of the additional information, and the controller 7 of the wearable device 1 has a configuration to display the additional information on a display direction side relative to the another electronic device based on the display control signal. When the smartphone A detects that the contact position of the user on the display screen of the smartphone A has moved to the display direction side of the additional information, the smartphone A recognizes that the additional information is selected, and shifts to a display screen based on the additional information. With this configuration, the wearable device 1 can realize an operation mode that makes it possible to select the screen SC (or also referred to as a display image) displayed by the wearable device 1 through a contact operation on the smartphone A, and select the screen SC by an operation of moving the contact position in a direction toward a display location of the screen SC. Therefore, the wearable device 1 can realize operations without causing a user to feel discomfort.

In the third example, a configuration has been described in which the smartphone A detects a moving direction of a contact position on the display surface of the smartphone A; however, the embodiments are not limited thereto. The wearable device 1 may be configured to detect the moving direction. For example, the wearable device 1 may detect the right hand R holding the smartphone A from a detection result of the detector 5 or a captured image captured by the imager 3, and may detect movement of the thumb of the right hand R (in other words, the upper limb). Upon detecting the movement of the thumb of the right hand R (upper limb), the wearable device 1 estimates which of the display directions of a plurality of screens SC displayed on the display unit 2 matches the moving direction. The wearable device 1 transmits, to the smartphone A, a signal indicating that the estimated screen SC matching the moving direction has been selected. The smartphone A shifts to the display that is based on the selected screen SC, on the basis of the signal received from the wearable device 1.

Figure 10:
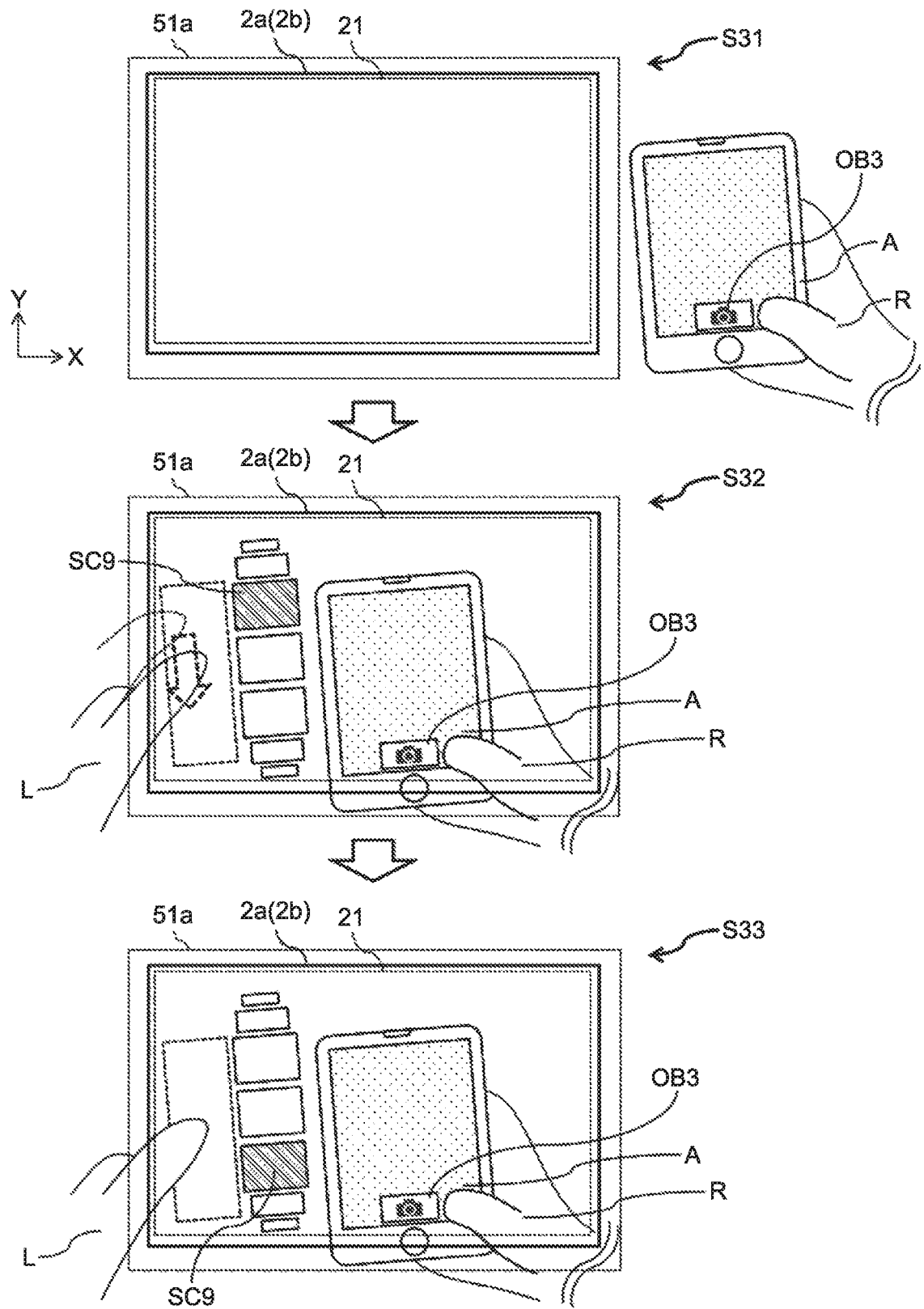
FIG. 10 is a diagram illustrating a fourth example of the process performed by the wearable device according to some embodiments.

FIG. 10 is a diagram illustrating a fourth example of the process performed by the wearable device 1 according to the embodiments.

In the fourth example, the smartphone A has an imaging function. As illustrated at Step S31, the smartphone A is executing the imaging function, and displaying a sequentially-captured image as preview display on the display screen (the sequentially-captured image corresponds to a hatched portion illustrated in FIG. 10). The smartphone A displays an object OB3 (for example, a shutter button) for storing the sequentially-captured image on the display screen.

At Step S31, the smartphone A is present outside the predetermined space 51a. In this state, if the user moves the right hand to the left, the smartphone A moves to the inside of the predetermined space 51a as illustrated at Step S32.

Upon detecting that the smartphone A is present in the predetermined space 51a, the wearable device 1 displays a plurality of screens SC9 in the display region 21 as illustrated at Step S32. The screens SC9 include additional information related to the imaging function being executed by the smartphone A, for example. The screens SC9 may be defined as additional information related to display contents being displayed by the smartphone A, for example. The display contents include preview display, a shutter button, and the like, for example. The screens SC9 may be a list of functions related to imaging that can be implemented by the smartphone A, for example. The list of the functions includes imaging modes suitable for a plurality of imaging scenes, such as a person, a landscape, a backlit subject, and a night view. The screens SC9 may be a list of pieces of photographic data captured and stored in the past. As illustrated at Step S32, each of the screens SC9 is displayed in parallel along a side edge of the smartphone A.

At Step S32, the user places the first finger of the left hand L to the front of the user. The first finger of the left hand L placed to the front is located adjacent to the plurality of screens SC9 in the predetermined space 51a. At this time, the user moves the first finger of the left hand L downward (for example, in a direction indicated by a dashed-line arrow in FIG. 10) along the direction in which the screens SC9 are arranged. In the wearable device 1, the detector 5 detects that the first finger has moved downward, and each of the screens SC9 is scrolled downward based on the movement. A position of the screen indicated by hatching among the plurality of screens SC9 is changed downward upon transition from Step S32 to Step S33.

In the example in FIG. 10, the wearable device 1 is configured to, when the first finger of the left hand L moves in a predetermined direction at a position not overlapping with the screen SC9, scroll the screens SC9 in a direction that is based on the movement direction. In a case where such configuration is provided, when the first finger of the left hand L overlaps with any of the plurality of screens SC9, the wearable device 1 may recognize that the overlapped screen SC9 is selected by the user, for example. In this case, the wearable device 1 may transmit a control signal for executing a function based on the selected screen SC9 to the smartphone A, for example.

Figure 11:
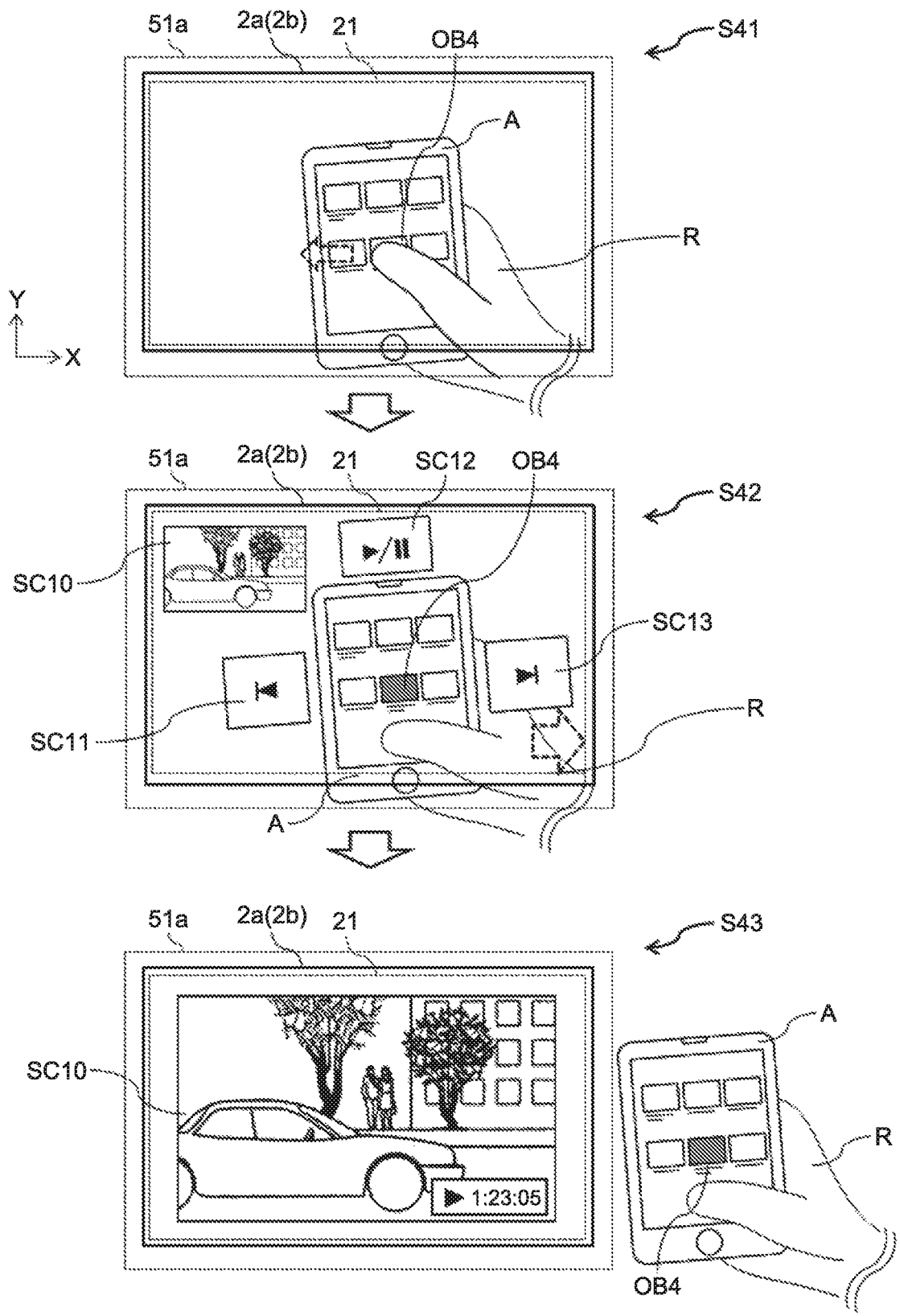
FIG. 11 is a diagram illustrating a fifth example of the process performed by the wearable device according to some embodiments.

FIG. 11 is a diagram illustrating a fifth example of the process performed by the wearable device 1 according to some embodiments.

In the fifth example, a plurality of moving image files are stored in the smartphone A. At Step S41, the smartphone A displays thumbnail images (objects OB4) of the plurality of moving image files. At Step S41, the smartphone A is present in the predetermined space 51a. In this case, the wearable device 1 is in a state that nothing is displayed on the display unit 2. Embodiments are not limited to the configuration as described above. At Step S41, the wearable device 1 may display additional information related to display contents of the smartphone A.

At Step S41, the thumb of the right hand R of the user is in touch with (in other words, selects) one of the plurality of thumbnails (for example, an image located in the middle of the lower line) displayed by the smartphone A. The thumb of the right hand R of the user performs an operation of moving the contact position in a direction toward the outside of the smartphone A while being in touch with the thumbnail image OB4. This operation may provide an operational feeling as if the selected thumbnail image OB4 were dragged from the smartphone A to the predetermined space 51a (in other words, the foreground that can be viewed by the user) on the outside of the smartphone A. Upon detecting such an operation performed by the user, the smartphone A transfers moving image data corresponding to the selected thumbnail image OB4 to the wearable device 1. Upon detecting such an operation, the smartphone A changes a display mode of the selected thumbnail image OB4.

Upon receiving the moving image data corresponding to the thumbnail image OB4 from the smartphone A, the wearable device 1 displays a moving image replay screen SC10 (for example, additional information) on the display unit 2 and executes replay of a moving image based on the moving image data (Step S42). In this case, the moving image replay screen SC10 is displayed in a reduced size at a position not overlapping with the smartphone A when viewed.

In this manner, according to the fifth example, when a contact operation is performed such that an image selected by contact with the smartphone A is moved to the outside of the smartphone A, the wearable device 1 is able to display the additional information related to the selected image in the predetermined space 51a that can be viewed together with the smartphone A. With this configuration, the user can refer to the additional information by the wearable device 1 at only a desired timing. This operation is an intuitive and easy operation. The wearable device 1 may be configured to display the selected image itself in the predetermined space 51a in response to a contact operation performed such that the image selected on the smartphone A is moved to the outside of the smartphone A, rather than displaying the additional information related to the selected image in the predetermined space 51a.

In the above-described configuration, the wearable device 1 recognizes an operation of moving (in other words, dragging) the image selected by contact with the smartphone A in a direction toward the outside of the smartphone A, on the basis of detection of the movement of the contact position; however, the embodiments are not limited thereto. For example, the wearable device 1 may cause the detector 5 or the imager 3 (out-camera) to detect an operation of moving the selected image on the smartphone A. That is, the wearable device 1 has a configuration to display the moving image replay screen SC10 (additional information) on the display unit 2 upon detecting that an object in contact with the smartphone A has performed a predetermined contact operation while the smartphone A (another electronic device) is present in the predetermined space 51a. In a case where the wearable device 1 detects the contact operation on the smartphone A using the imager 3, the wearable device 1 may activate the imager 3 if the detector 5 detects that the smartphone A is present in the predetermined space 51a in front of the user, for example.

Referring back to FIG. 11, as illustrated at Step S42, upon displaying the moving image replay screen SC10 on the display unit 2, the wearable device 1 displays operation screens SC11 to SC13 for operations related to the moving image replay screen SC10 on the display unit 2. The operation screens SC11 to SC13 may be displayed based on the display control signal transmitted from the smartphone A. The display control signal transmitted from the smartphone A may include information on display directions of the operation screens SC11 to SC13. In this case, the wearable device 1 displays the operation screen SC11 leftward with respect to the smartphone A, displays the operation screen SC12 upward with respect to the smartphone A, and displays the operation screen SC13 rightward with respect to the smartphone A based on the information.

The wearable device 1 recognizes that the operation screen corresponding to a moving direction is selected based on movement of the thumb of the right hand R in touch with the display screen of the smartphone A in a direction in which any of the operation screens SC11 to SC13 is displayed. In this case, the wearable device 1 performs an operation corresponding to the operation screen. The movement of the thumb of the right hand R may be recognized by a touch panel (or a contact detector) of the smartphone A, or may be detected by the detector 5 or the imager 3 (out-camera) of the wearable device 1. For example, when the touch panel of the smartphone A detects that the thumb of the right hand R has moved upward on the display screen of the smartphone A, the smartphone A recognizes that the operation screen SC12 (for example, a screen indicating that a moving image replay instruction and a moving image pause instruction are to be executed) which displayed on the upper side of the smartphone A is selected. The smartphone A generates a control signal to pause a moving image when the moving image is being replayed on the display unit 2 of the wearable device 1, generates a control signal for replaying a moving image when the moving image is being paused, and transmits the control signal to the wearable device 1.

For example, the wearable device 1 detects, by the detector 5, that the thumb of the right hand R has moved upward on the display screen of the smartphone A (for example, in a direction in which the operation screen SC12 is displayed from the smartphone A). In this case, the wearable device 1 transmits a signal indicating that the operation screen SC12 is selected to the smartphone A. Upon receiving the signal from the wearable device 1, the smartphone A generates a control signal for controlling the wearable device 1 based on the received signal, and transmits the control signal to the wearable device 1. For example, when a moving image is being replayed on the display unit 2 of the wearable device 1, the smartphone A may generate a control signal for pausing the moving image. For example, when a moving image is being paused on the display unit 2 of the wearable device 1, the smartphone A may generate a control signal for replaying the moving image.

Referring back to FIG. 11, the user moves the right hand R to move the smartphone A from the inside of the predetermined space 51a to the outside of the predetermined space 51a in the state in which the moving image replay screen SC10 (additional information) is displayed on the display unit 2 as illustrated at Step S42. Upon detecting the movement of the smartphone A to the outside of the predetermined space 51a, the wearable device 1 displays the moving image replay screen SC10 in an enlarged manner as illustrated at Step S43. As illustrated at Step S43, the moving image replay screen SC10 may be enlarged so as to be fit in approximately the whole area of the display region 21 of the display unit 2.

Figure 12:
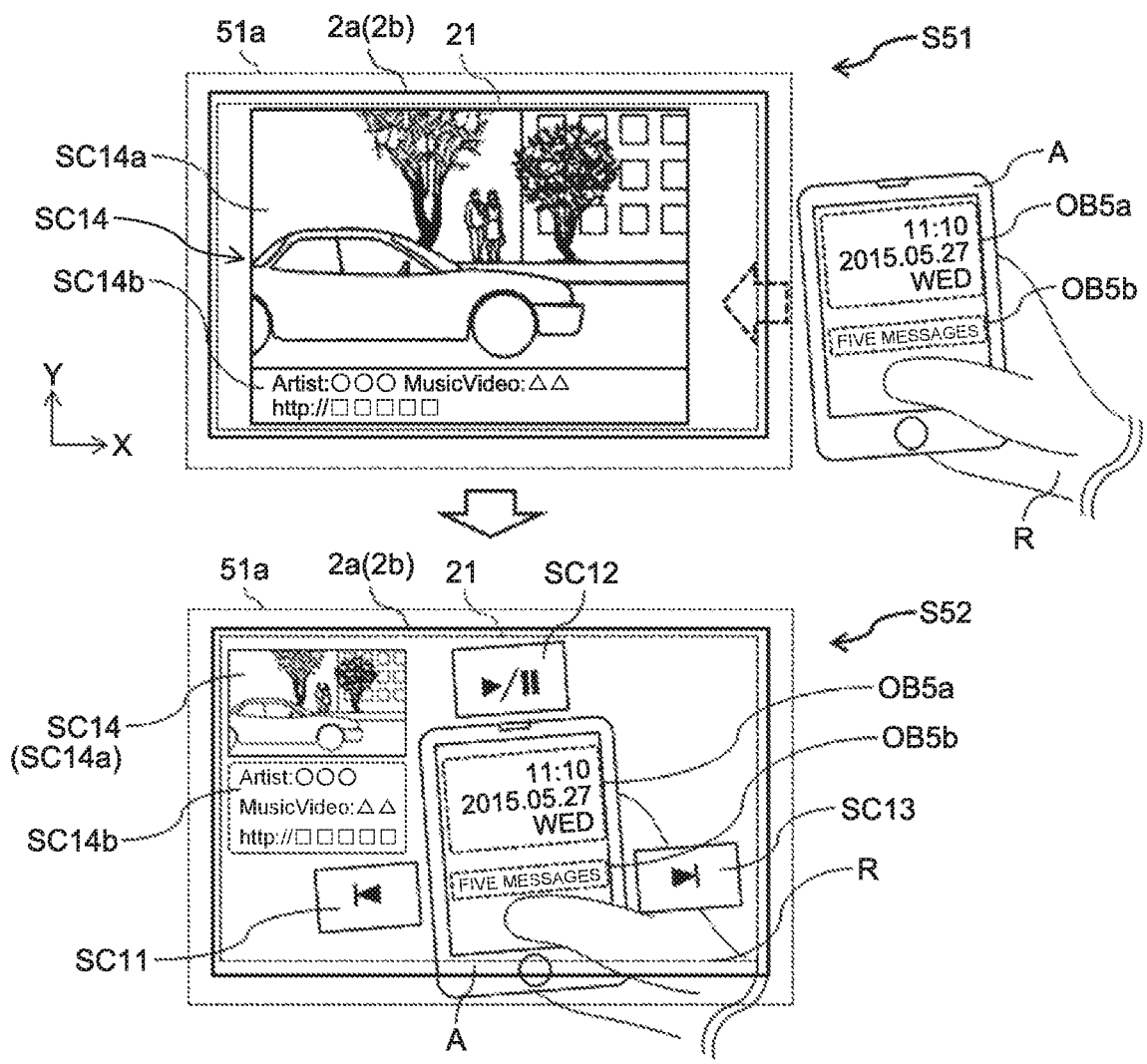
FIG. 12 is a diagram illustrating a sixth example of the process performed by the wearable device according to some embodiments.

FIG. 12 is a diagram illustrating a sixth example of the process performed by the wearable device 1 according to some embodiments.

As illustrated at Step S51, the smartphone A is present outside the predetermined space 51a in front of the user. The smartphone A displays pieces of text information OB5a and OB5b with different character sizes. The text information OB5a includes characters with a greater size than those in the text information OB5b.

As illustrated at Step S51, the wearable device 1 displays a moving image replay screen SC14 in a region that covers approximately the whole area of the display region 21 of the display unit 2. The moving image replay screen SC14 includes a plurality of display elements (hereinafter, may be simply referred to as elements) of a moving image SC14a and text information SC14b (for example, text information related to the moving image SC14a).

Subsequently, if the smartphone A moves from the outside of the predetermined space 51a to the inside of the predetermined space 51a, the wearable device 1 changes the size of the moving image replay screen SC14 in accordance with a position of the smartphone A that has entered the predetermined space 51a (Step S52).

At Step S52, the moving image SC14a, which is one of the elements of the moving image replay screen SC14, is displayed in a reduced size that fits in a space between one side of the display region 21 (a left side in the example in FIG. 12) and one side of the outline of the smartphone A (a left side in the example in FIG. 12) such that an aspect ratio remains unchanged as compared to Step S51.

When reducing the size of the moving image replay screen SC14 (image) in accordance with the movement of the position of the smartphone A (another electronic device) that has entered the predetermined space, the wearable device 1 may set a reduction direction to be identical to an entering direction of the smartphone A. For example, if the smartphone A enters the predetermined space 51a through a right side edge of the predetermined space 51a, that is, when the entering direction of the smartphone A is the leftward direction, the wearable device 1 may reduce the moving image replay screen SC14 in the leftward direction.

As illustrated at Step S52, the size of the moving image replay screen SC14 is changed such that the moving image replay screen SC14 fits in a region on the outside of the outline of the smartphone A (another electronic device) within the display region 21 of the display unit 2. With this configuration, the wearable device 1 can prevent the moving image replay screen SC14 from overlapping with the display screen of the smartphone A, thereby preventing interference with viewing of the display screen.

In a case where the moving image replay screen SC14 is reduced, if the text information SC14b that is one of the elements of the moving image replay screen SC14 is unexpectedly reduced in the same reduction ratio as that of the moving image SC14a, the text information may be reduced to the extent that the user is unable to view the text information. Therefore, at Step S52, the text information SC14b is separated and displayed on the outside of the region of the moving image replay screen SC14. The text information SC14b displayed on the outside of the region of the moving image replay screen SC14 is displayed with a character size that can be viewed by the user. That is, the wearable device 1 may have a configuration to change an enlargement and reduction ratio of each of the elements included in the moving image replay screen SC14 when changing the size of the moving image replay screen SC14 based on the position of the smartphone A in the predetermined space 51a. The text information SC14b may have the same size as the size of the characters of the text information SC14b that is included in the moving image replay screen SC14 that has not been displayed in a reduced size (Step S51), for example. The size of the text information SC14b may be changed so as to be the same as the size of text information (for example, OB5a or OB5b) displayed by the smartphone A that is present in the predetermined space 51a. In this case, even if the size of the text information SC14b is changed so as to be the same as the size of the text information OB5b that is displayed in a smaller size among the pieces of the text information (for example, OB5a or OB5b) displayed by the smartphone A, it is likely that the text information can be viewed by the user.

In this manner, the wearable device 1 has a configuration to, when the size of the moving image replay screen SC14 (image) is changed and a width of the image in a predetermined direction becomes a predetermined length or less (reduced to a predetermined size), separate at least one element from the elements included in the image and display the separated element on the outside of the region of the image.

As illustrated at Step S52, the text information SC14b that is an element separated from the moving image replay screen SC14 is displayed at a position not overlapping with the smartphone A in the display region 21 of the display unit 2.

When the size of the moving image replay screen SC14 (image) is changed and a width of the image in a predetermined direction becomes shorter than a predetermined length, the wearable device 1 may hide at least one of the elements (for example, text information SC14b) included in the image.

As illustrated at Step S52, if the smartphone A is present in the predetermined space 51a, the wearable device 1 displays the operation screens SC11 to SC13 on the display unit 2. With this configuration, the wearable device 1 allows for operation on the moving image replay screen SC14 by a behavior of the right hand R holding the smartphone A.

Figure 13:
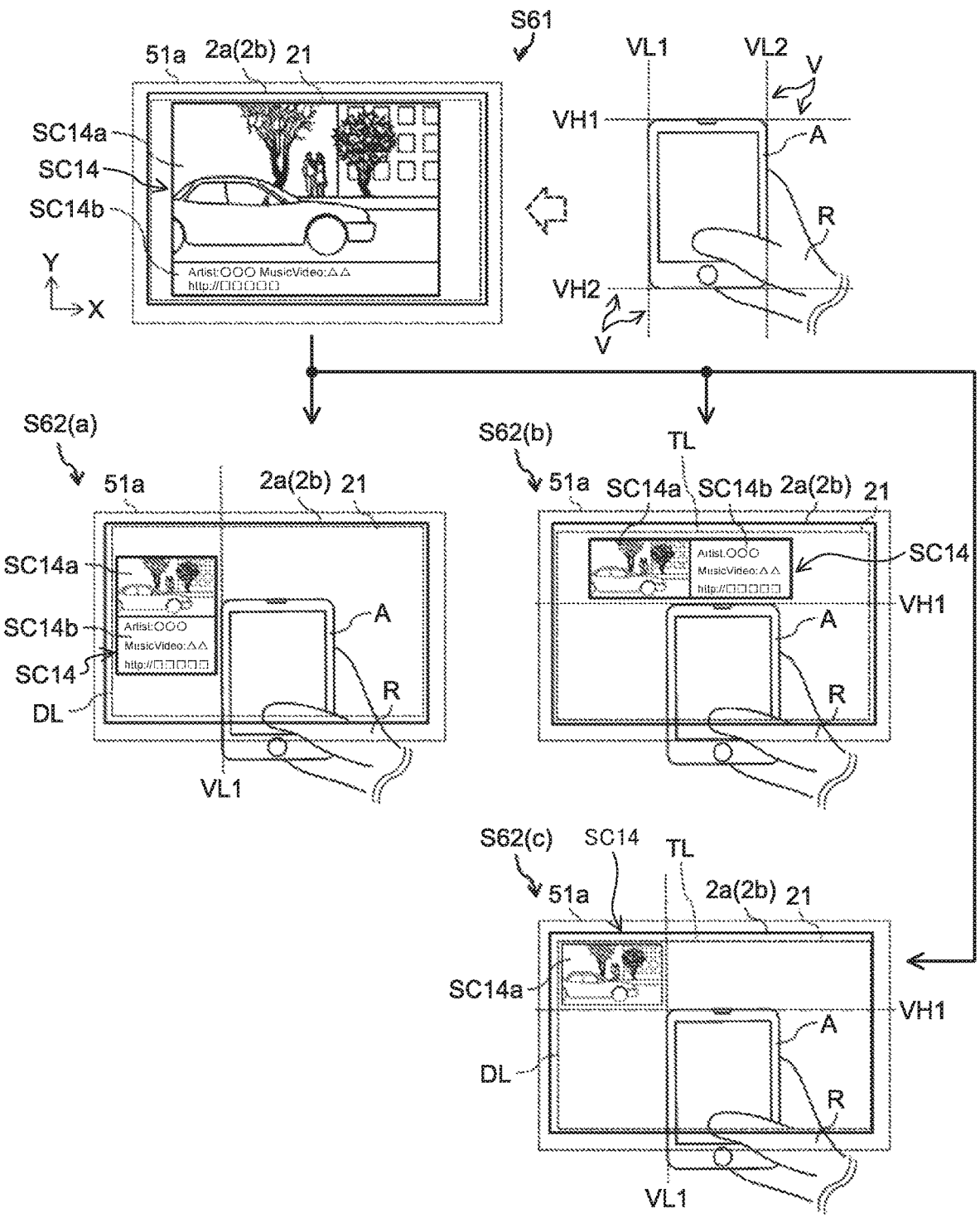
FIG. 13 is a diagram for further explaining the sixth example of the process performed by the wearable device according to some embodiments.

FIG. 13 is a diagram for further explaining the sixth example of the process performed by the wearable device 1 according to some embodiments. In the above described embodiments, a configuration has been described with reference to FIG. 12, in which if the smartphone A enters the predetermined space 51a, the size of the moving image replay screen SC14 is changed so as to fit in a region on the outside of the outline of the smartphone A within the display region 21 of the display unit 2. FIG. 13 is a view illustrating a concrete example of such configuration.

As illustrated at Step S61, side edges V (VL1, VL2, VH1, and VH2 in the example in FIG. 13) of the smartphone A are defined. The side edges V are defined as concepts including virtual lines that pass through the side edges of the smartphone A. If the smartphone A enters the predetermined space 51a, the wearable device 1 changes the size of the moving image replay screen SC14 based on the position of the smartphone A that has entered the predetermined space (Step S62).

When changing the size of the moving image replay screen SC14, the wearable device 1 may change the size as illustrated at Step S62(a). In the example illustrated at Step S62(a), the size of the moving image replay screen SC14 may be changed such that the moving image replay screen SC14 fits in a space between one side of the display region 21 (for example, a left edge DL) and one side edge VL1 that is the closest to the left edge DL among the plurality of side edges V of the smartphone A (another electronic device). The side edge V that is the closest to the one side of the display region 21 among the plurality of side edges V of the smartphone A is defined as a side edge for which a distance to the one side of the display region 21 is the shortest and which is parallel to the one side of the display region 21 (or a side edge for which an intersecting angle with respect to the one side of the display region 21 is the smallest).

When modifying a shape of the moving image replay screen SC14 as illustrated at Step S62(a), the wearable device 1 may change arrangement of the moving image SC14a and the text information SC14b that are the elements of the moving image replay screen SC14. That is, the wearable device 1 may have a configuration to, when the size of the image is changed and a width of the image in a predetermined direction becomes shorter than a predetermined length, modify the shape of the image, separate the plurality of elements included in the image, and rearrange and display the elements in the image with the modified shape.

When changing the size of the moving image replay screen SC14, the wearable device 1 may change the size as illustrated at Step S62(b). In the example illustrated at Step S62(b), the size of the moving image replay screen SC14 may be changed such that the moving image replay screen SC14 fits in a space between one side of the display region 21 (for example, an upper edge TL) and the side edge VH1 that is the closest to the upper edge TL among the plurality of side edges V of the smartphone A.

When changing the size of the moving image replay screen SC14, the wearable device 1 may change the size as illustrated at Step S62(c). In the example illustrated at Step S62(c), the size of the moving image replay screen SC14 may be changed so as to fit in a space between one side of the display region 21 (for example, the left edge DL) and one side edge VL1 that is the closest to the left edge DL among the plurality of side edges V of the smartphone A (another electronic device) and in a space between another side of the display region 21 (for example, the upper edge TL) and another side edge VH1 that is the closest to the upper edge TL among the plurality of side edges V of the smartphone A. In this case, as illustrated at Step S62(c), the text information SC14b as the element of the moving image replay screen SC14 may be hidden in the moving image replay screen SC14.

Figure 14:
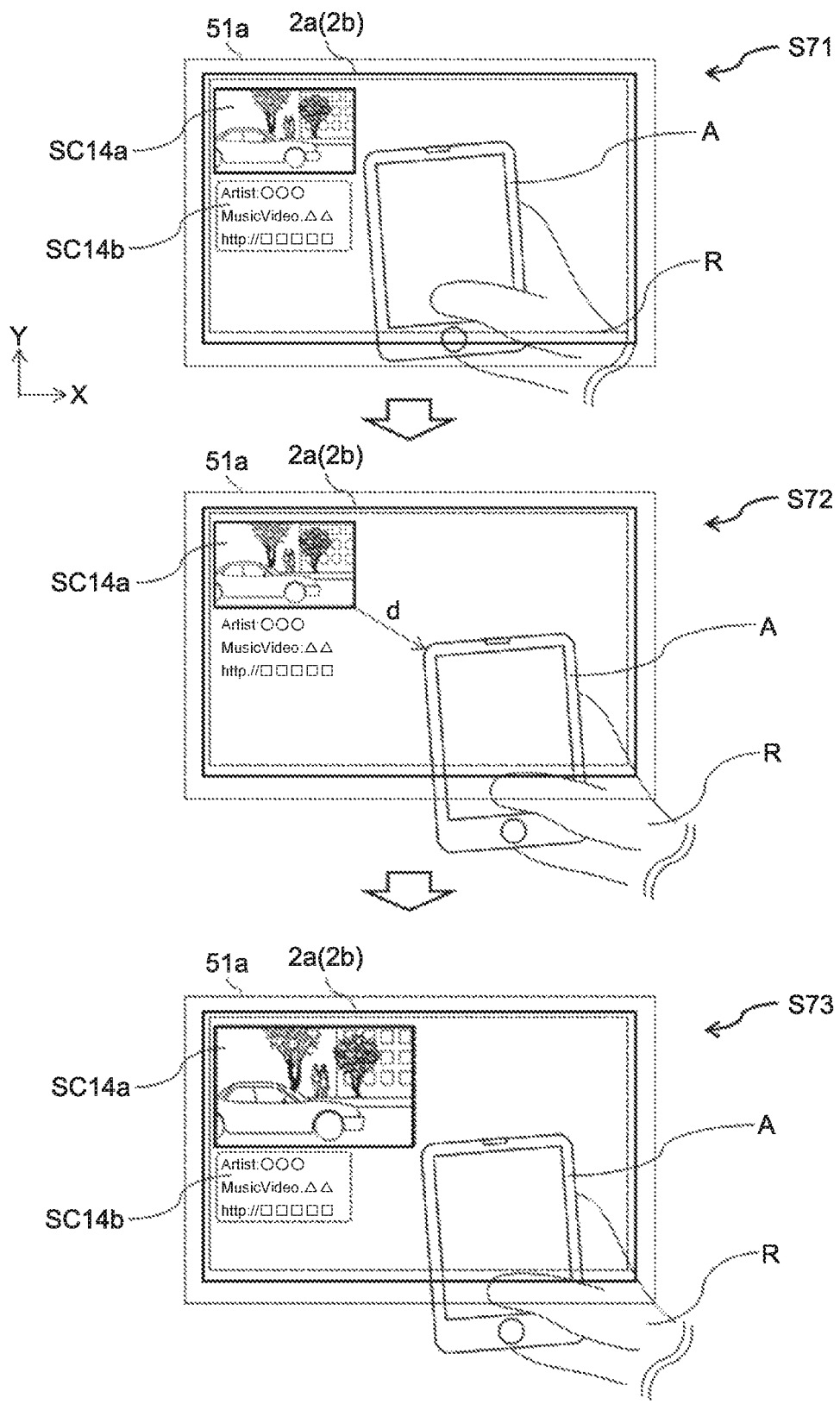
FIG. 14 is a diagram for further explaining the sixth example of the process performed by the wearable device according to some embodiments.

FIG. 14 is a diagram for further explaining the sixth example of the process performed by the wearable device 1 according to the embodiments.

A state illustrated at Step S71 is the same as the state illustrated at Step S52 in FIG. 12, in which the moving image SC14a is displayed in a size that is based on the position of the smartphone A that has entered the predetermined space 51a. Illustrations of the display contents displayed on the display screen of the smartphone A are omitted.

When the smartphone A moves in a direction away from the moving image SC14a (Step S72), the wearable device 1 detects a distance d by which the smartphone A is separated from the moving image SC14a (or a distance between the smartphone A and the moving image SC14a). If the distance d becomes longer than a predetermined length (in other words, if the smartphone A is separated from the moving image SC14a by a predetermined length or longer), the wearable device 1 changes the size of the moving image SC14a based on the position of the smartphone A at this point of time (Step S73).

With this configuration, when the user slightly moves the position of the smartphone A by accident, it is possible to prevent the size of the moving image SC14a from being changed frequently in accordance with such movement.

When the wearable device 1 detects that the smartphone A is further separated from the moving image SC14a by a distance longer than the predetermined length from the state illustrated at Step S73, the wearable device 1 may change the size of the moving image SC14a again based on the position of the smartphone A at this point of time. That is, the wearable device 1 may have a configuration to change the size of the moving image SC14a (image) in accordance with movement of the position of the smartphone A (another electronic device) that has entered the predetermined space 51a, and after completing the change, gradually change the size of the image in accordance with movement of the position of the smartphone A in the predetermined space 51a. In a case where the size of the moving image SC14a is gradually changed, when the size of the image becomes greater than a predetermined size, the wearable device 1 may integrate the moving image SC14a and the text information SC14b, which have been displayed in a separated manner, into a single image.

When the smartphone A is further separated away from the moving image SC14a and moved to the outside of the predetermined space 51a, the size of the moving image SC14a may be returned to the size in which the smartphone A had not entered the predetermined space. That is, the wearable device 1 may return the size of the moving image SC14a to the size that had not been changed based on detection that the smartphone A has moved to the outside of the predetermined space 51a after completing the change of the size of the moving image SC14a (image) based on the position of the smartphone A.

Modifications

Embodiments have been described above. Various modifications will be described below.

In the above-described embodiments, a configuration has been described in which if the smartphone A is present in the predetermined space 51a, the wearable device 1 displays the additional information related to display of the smartphone A at the position that is based on the position of the smartphone A (for example, a position not overlapping with the smartphone A as in the example illustrated in FIG. 7). The wearable device 1 may define the display position of the additional information based on other factors, for example.

Figure 15:
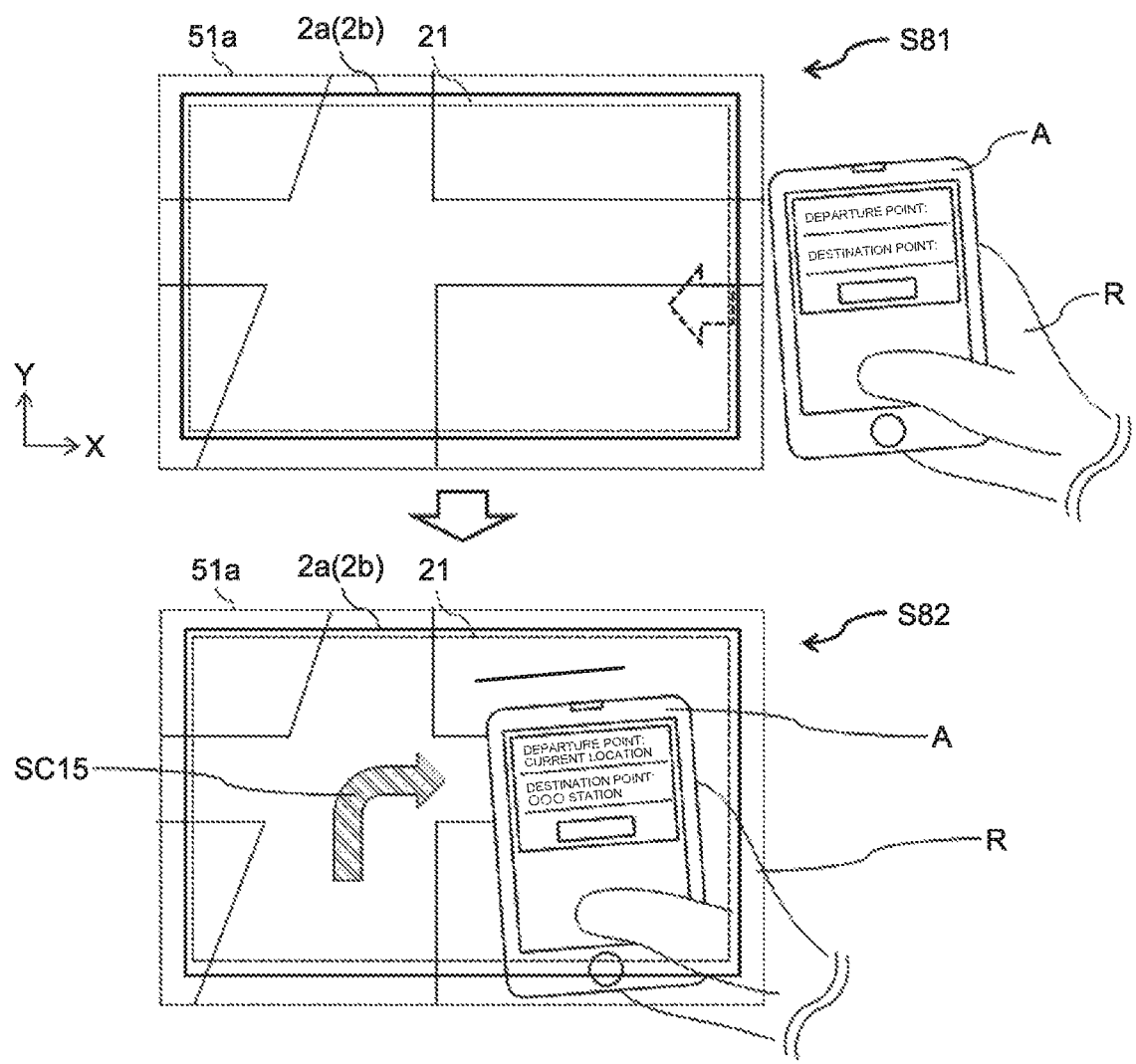
FIG. 15 is a diagram illustrating a seventh example of the process performed by the wearable device according to some embodiments.

FIG. 15 is a diagram illustrating a seventh example of the process performed by the wearable device 1 according to the embodiments.

In the seventh example, the smartphone A has a route guide function. As illustrated at Step S81, the smartphone A is executing the route guide function, and displaying a screen on which a departure point and a destination point can be input. A user can refer to a guided route or the shortest route from the departure point to the destination point by inputting a desired departure point name and a desired destination point name.

As illustrated at Step S81, the user is viewing a scenery in front of the user through the display unit 2 of the wearable device 1. A road that can be the above-described guided route is present in the scenery in the front.

The user inputs the departure point and the destination point by moving the smartphone A to the inside of the predetermined space 51a in the front and operating the smartphone A. If a current position is specified as the departure point, the wearable device 1 receives, from the smartphone A, information on a route from the input departure point to the destination point, and detects the current position of the user and an orientation to which the user faces. With this configuration, the wearable device 1 estimates a route sign SC15 (for example, an arrow) of a route expected to be started by the user from the current position, and displays the sign so as to overlap with the scenery viewed by the user (Step S82).

If the route expected to be started is changed by a spot different from the input destination point being input again or by the route being changed from a moving route by walking to a moving route by public transport and walking for example, the wearable device 1 may display a different sign SC again in accordance with the change.

In the above-described embodiments, a configuration has been described in which if an electronic device such as the smartphone A or the watch-type device B as a predetermined object is present in the predetermined space 51a, additional information related to display of the electronic device is displayed on the display unit 2 of the wearable device 1; however, a target of the additional information is not limited to the electronic device. Another configuration has been described in which when the additional information related to the display of the smartphone A is displayed on the display unit 2, and if a finger in touch with the smartphone A is slid in a direction in which the additional information is displayed, the wearable device 1 recognizes that the additional information is selected; however, the embodiments are not limited thereto. The wearable device 1 may be configured to select the additional information by an operation other than the operation of the finger in touch with the smartphone A, for example.

Figure 16:
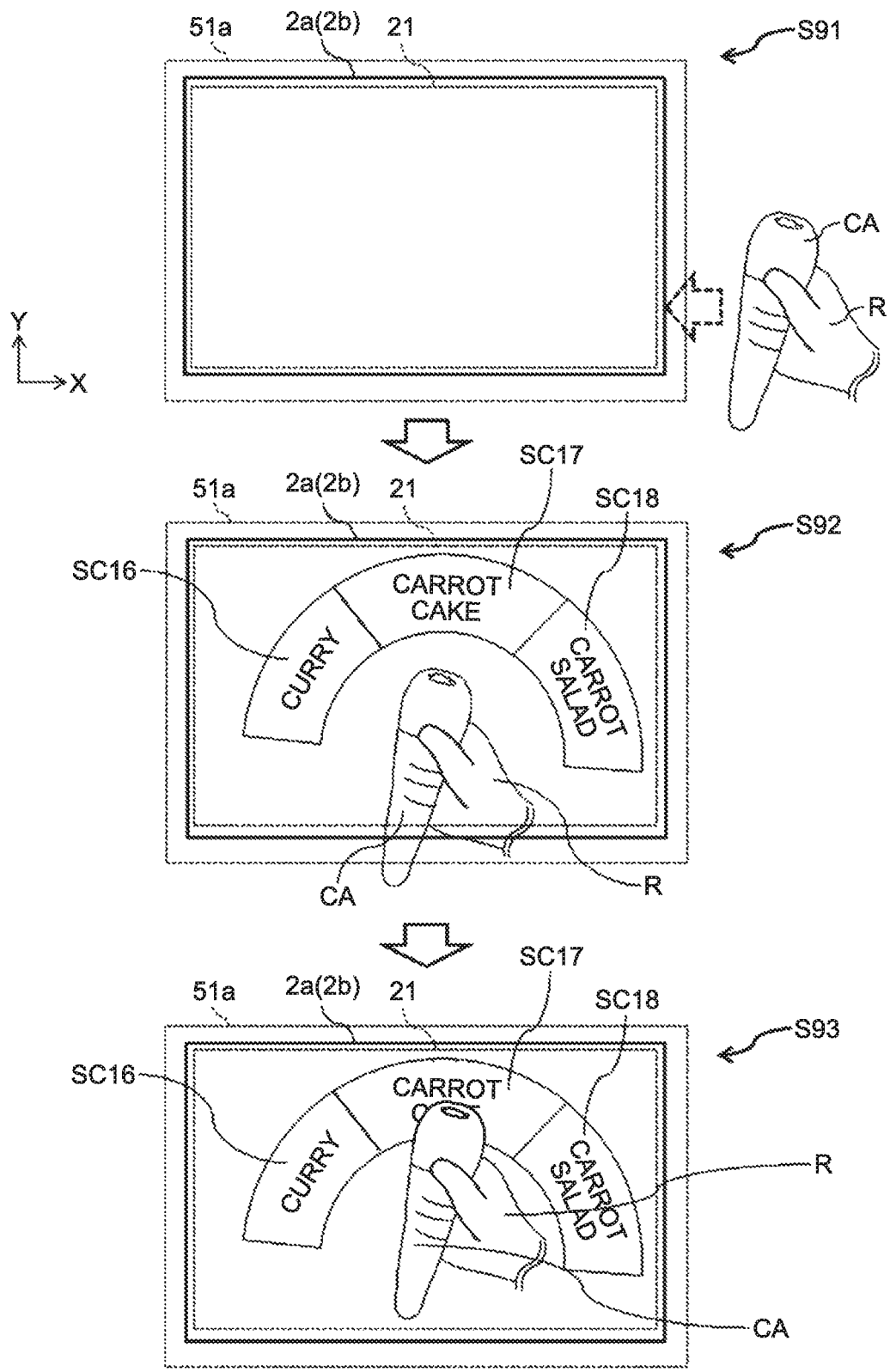
FIG. 16 is a diagram illustrating an eighth example of the process performed by the wearable device according to some embodiments.

FIG. 16 is a diagram illustrating an eighth example of the process performed by the wearable device 1 according to some embodiments.

As illustrated at Step S91, a user wears the wearable device 1 and holds a carrot CA. If the carrot CA is moved to the inside of the predetermined space 51a in front of the user, the wearable device 1 analyzes shape information and color information on the object held by the right hand R of the user from a captured image captured by the imager 3, and recognizes that the object is the carrot CA. The wearable device 1 displays images SC16 to SC18 as a list of recipes for cooking using the carrot CA on the display region 21 based on the recognition that the carrot CA is present in the predetermined space 51a as illustrated at Step S92, for example. Each of the images SC16 to SC18 is displayed at the position not overlapping with the carrot CA when viewed.

As illustrated at Step S93, the user moves the carrot CA such that a part of the carrot CA overlaps with any of the images SC16 to SC18 (the image SC17 in the example in FIG. 16) while the images SC16 to SC18 are being displayed. In this case, the wearable device 1 recognizes that the image SC17 overlapping with the carrot CA is selected. Upon recognizing that the image SC17 is selected, the wearable device 1 may shift to a display screen of recipes for cooking based on the image SC17, for example.

In this manner, the wearable device 1 includes the display unit 2 arranged in front of eyes, the detector 5 (or the imager 3) that detects a predetermined object (the carrot CA in the above-described example) that is present in a real space, and the controller 7 that displays additional information (for example, the images SC16 to SC18) related to the predetermined object at the position not overlapping with the predetermined object in the display region 21 of the display unit 2 if the predetermined object is present in the predetermined space 51a in front of a user, and performs a selection process on the additional information upon detecting that the predetermined object has moved and overlapped with a region in which the additional information is displayed. The predetermined object is of course not limited to the carrot CA, and may be an electronic device, such as the smartphone A or the watch-type device B.

In the above-described embodiments, a configuration has been described in which if the smartphone A (another electronic device) as a predetermined object is present in the predetermined space 51a, the wearable device 1 receives a control signal including a definition of a display direction from the smartphone A, and displays the additional information on the left side, the upper side, and the right side of the smartphone A based on the display direction; however, the display position of the additional information is not limited thereto.

Figure 17:
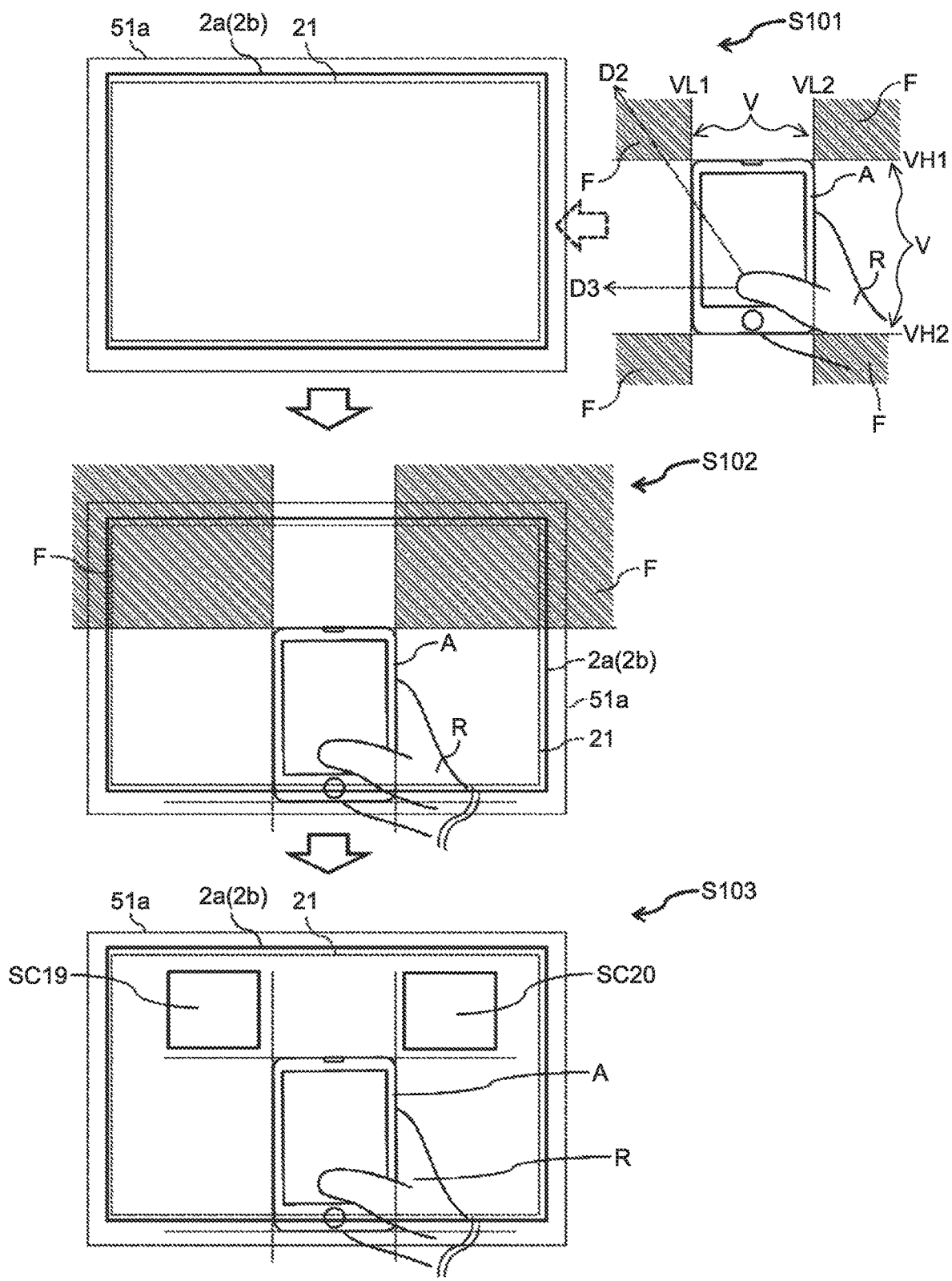
FIG. 17 is a diagram illustrating a ninth example of the process performed by the wearable device according to some embodiments.

FIG. 17 is a diagram illustrating a ninth example of the process performed by the wearable device 1 according to some embodiments.

In the above-described embodiments, the additional information is selected when a finger in touch with the smartphone A is slid in a direction toward the additional information while the additional information is being displayed at the position on the outside of the outline of the smartphone A. Such a sliding operation may be conflict with normal operations on the smartphone A, which are different from the operation of selecting the additional information. Therefore, in the ninth example, a configuration will be described in which the operation of selecting the additional information and the normal operations on the smartphone A are distinguished by sliding directions of sliding operations on the smartphone A.

As illustrated at Step S101, a region (space) around the smartphone A is divided into eight regions by four side edges V of the smartphone A (the side edges V are concepts including virtual lines that pass through the side edges V). In the smartphone A, scrolling of screens and switching of screens are usually performed by sliding operations in the vertical direction or in the horizontal direction with respect to the touch panel of the smartphone; therefore, regions located obliquely with respect to the smartphone A among the divided eight regions are defined as selection regions F for selecting the additional information. In a case where the finger in touch with the touch panel of the smartphone A is slid, if an extended line of a locus of the sliding corresponds to a direction that passes through any of the selection regions F (a direction D2 at Step S101), the additional information is selected. In contrast, if the extended line of the locus of the sliding corresponds to a direction that does not pass through the selection regions F (a direction D3 at Step S101), a normal operation on the smartphone A is performed based on the direction. If the locus of the sliding is a curve, it may be possible to determine correspondence with the selection region based on a direction of a line connecting a start point and an end point of the locus. The way to divide the region around the smartphone A may be freely determined by a person skilled in the art, and which region is used as the selection region for the additional information may be freely determined by a person skilled in the art.

In a state in which the definition illustrated at Step S101 is applied, if the smartphone A moves to the inside of the predetermined space 51a (Step S102), the wearable device 1 displays pieces of additional information SC19 and SC20 at the positions within the selection regions F in the display region 21 (Step S103). With this configuration, a user can select the pieces of additional information SC19 and SC20 by sliding a finger in touch with the smartphone A in directions in which the pieces of additional information SC19 and SC20 are displayed. The user can also perform normal operations on the smartphone A by sliding the finger in directions different from the directions in which the pieces of additional information SC19 and SC20 are displayed. At Step S102, if the smartphone A detects that it is located in the predetermined space 51a, the smartphone A generates a control signal for allowing the wearable device 1 to recognize the defined selection regions F, and transmits the control signal to the wearable device 1.

In the example in FIG. 17 (the ninth example), a configuration has been described in which the operation of selecting the additional information and operations different from the selection operation are distinguished by dividing the region around the smartphone A; however, the way to distinguish is not limited thereto.

Figure 18:
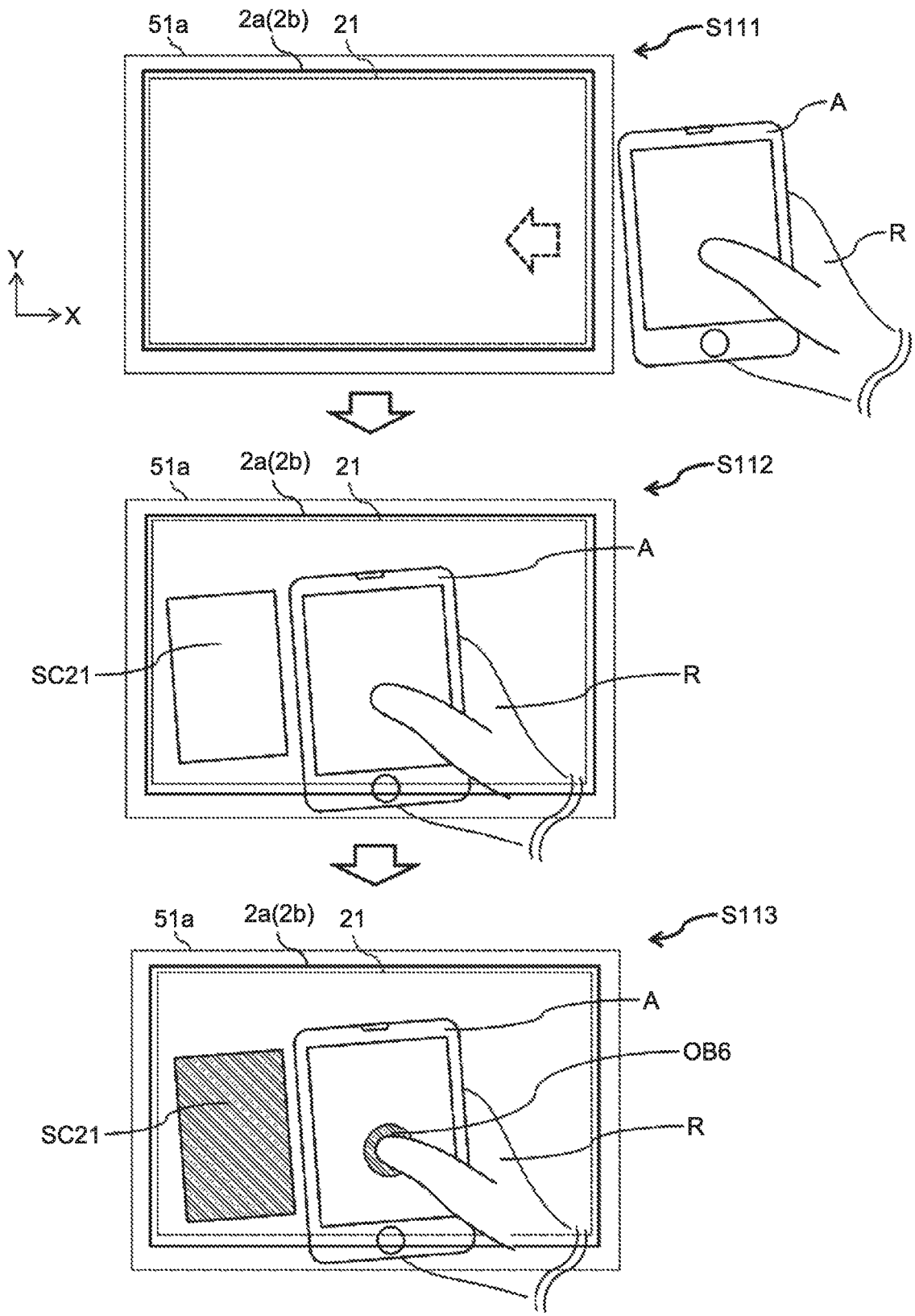
FIG. 18 is a diagram illustrating a tenth example of the process performed by the wearable device according to some embodiments.

FIG. 18 is a diagram illustrating a tenth example of the process performed by the wearable device 1 according to some embodiments.

As illustrated at Step S111, the smartphone A is held by a user. If the user moves the smartphone A to the inside of the predetermined space 51a, the wearable device 1 displays additional information SC21 related to the smartphone A (Step S112). The smartphone A detects a predetermined contact operation on the smartphone A, e.g., a contact operation that lasts longer than a predetermined time such that a position remains unmoved while contact with the touch panel of the smartphone A is maintained. In this case, the smartphone A shifts to a state in which operations on the additional information SC21 (or operations on display of the wearable device 1) are enabled (Step S113). Upon shifting to the state in which operations on the additional information SC21 are enabled, the wearable device 1 displays a visual effect OB6 in the contact position on the touch panel to allow the user to recognize the shift (Step S113). With this configuration, the user can switch between operations on the additional information SC21 (or operations on the display of the wearable device 1) and other operations by performing an intended operation on the smartphone A.

In the above-described embodiments, a configuration has been described in which the additional information is displayed at a position not overlapping with the electronic device when viewed; however, the embodiments are not limited thereto.

Figure 19:
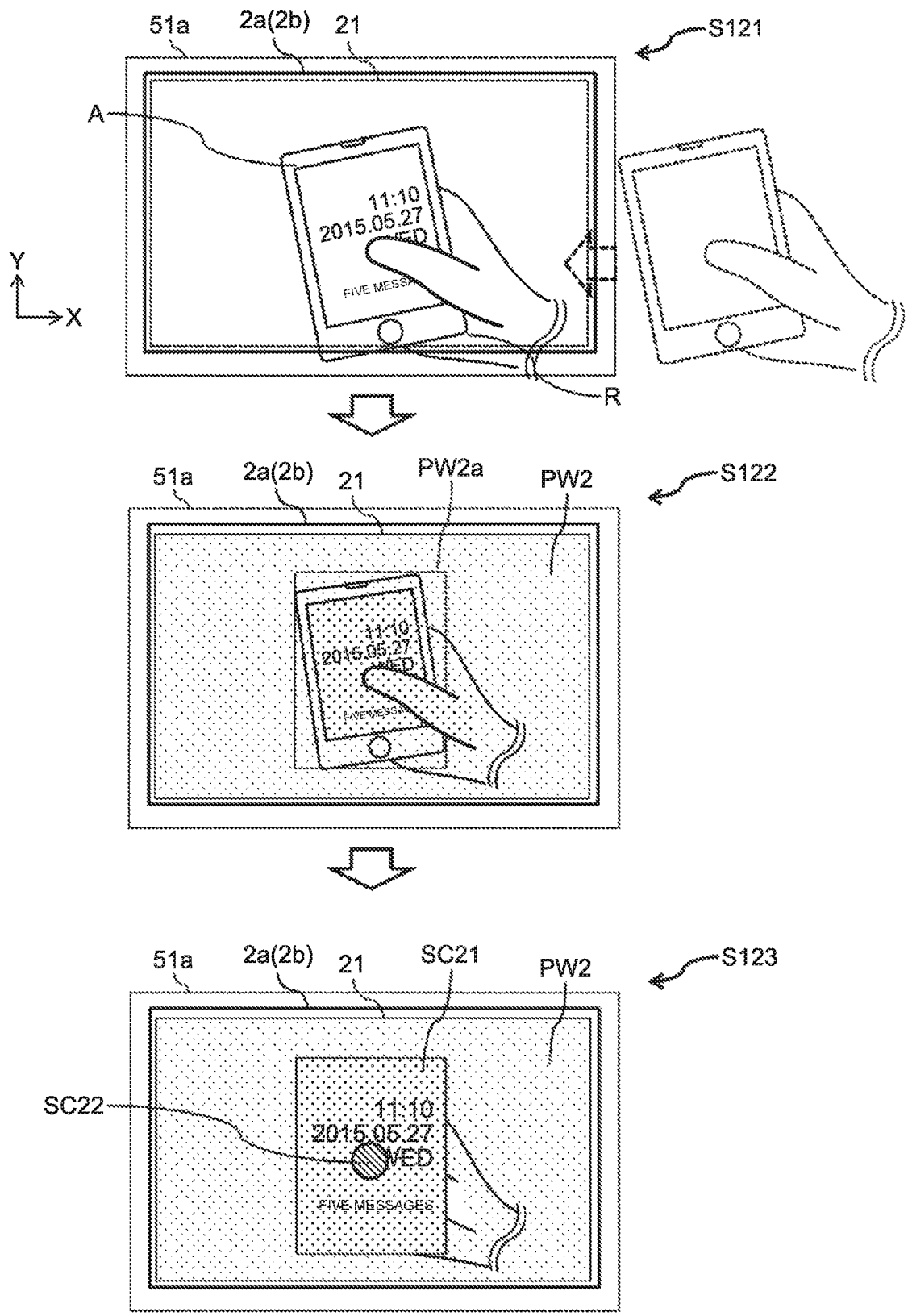
FIG. 19 is a diagram illustrating an eleventh example of the process performed by the wearable device according to some embodiments.

FIG. 19 is a diagram illustrating an eleventh example of the process performed by the wearable device 1 according to some embodiments.

As illustrated at Step S121, if the smartphone A moves to the inside of the predetermined space 51a, the wearable device 1 detects that the smartphone A is present in the predetermined space 51a and activates the imager 3 (out-camera) (Step S122). A captured image captured by the imager 3 is displayed on the display unit 2 (the captured image displayed on the display unit 2 is referred to as a preview window PW2). The wearable device 1 starts a communication connection to the smartphone A, and receives a display control signal for executing predetermined display on the display unit 2 of the wearable device 1 from the smartphone A. The wearable device 1 analyzes the captured image, and thereby calculates a range PW2a encompassing the smartphone A that appears in the preview window PW2. The wearable device 1 displays a screen SC21 including additional information that is based on the received display control signal, as an image with a size equal to or greater than the size of the range PW2a (Step S123). The screen SC21 may be an image identical to a display image that is displayed while the smartphone A (electronic device) is present in the predetermined space 51a. The screen SC21 may preferably be an opaque image. If the wearable device 1 uses the screen SC21 that is an opaque image, the screen SC21 overlaps with the smartphone A, and accordingly the smartphone A is not viewed. Therefore, the wearable device 1 may display a visual effect SC22 to allow the user to recognize a position in touch with the display screen of the smartphone A.

In the above-described example, the wearable device 1 is configured to display the screen SC21 so as to encompass the smartphone A that appears in the preview window PW2; however, the embodiments are not limited thereto. The wearable device 1 may detect a position and a shape of the smartphone A upon detecting that the smartphone A is present in the predetermined space 51a, estimate an outline of the smartphone A viewed through the display unit 2 (an outline of the smartphone A in the display region 21) based on a detection result, and display the screen SC21 so as to encompass the estimated outline of the smartphone A.

In this manner, the wearable device 1 includes a display unit arranged in front of eyes, a detector (or an imager) that detects a predetermined object that is present in a real space, and a configuration that displays an image including additional information related to the predetermined object such that the image encompasses the predetermined object in a display region of the display unit (the predetermined object that appears in the preview window captured by the imager 3) if the predetermined object is present in a predetermined space in front of a user.

When the screen SC21 is displayed in an overlapping manner so as to encompass the predetermined object, as illustrated at Steps S122 and S123, the screen SC21 may be displayed in an orientation in which the inclination of the predetermined object with respect to the outline of the display region 21 of the display unit 2 is corrected.

With this configuration, when the smartphone A is viewed in an oblique manner as illustrated at Step S122, the wearable device 1 can display the additional information related to the smartphone A as a screen for which the inclination is corrected; therefore, visibility is improved.

The predetermined object may be an electronic device different from the electronic device such as the smartphone A. The different electronic device includes, for example, paper media on which characters are printed, electronic documents, such as PDF files, and the like. For example, when a part of electronic documents displayed by the electronic device is displayed in an orientation deviated by 90 degrees with respect to other parts, the wearable device 1 can correct the orientation of the corresponding positional part so as to coincide with the other parts and display the corrected part of the electronic documents; therefore, visibility is improved.

Figure 20:
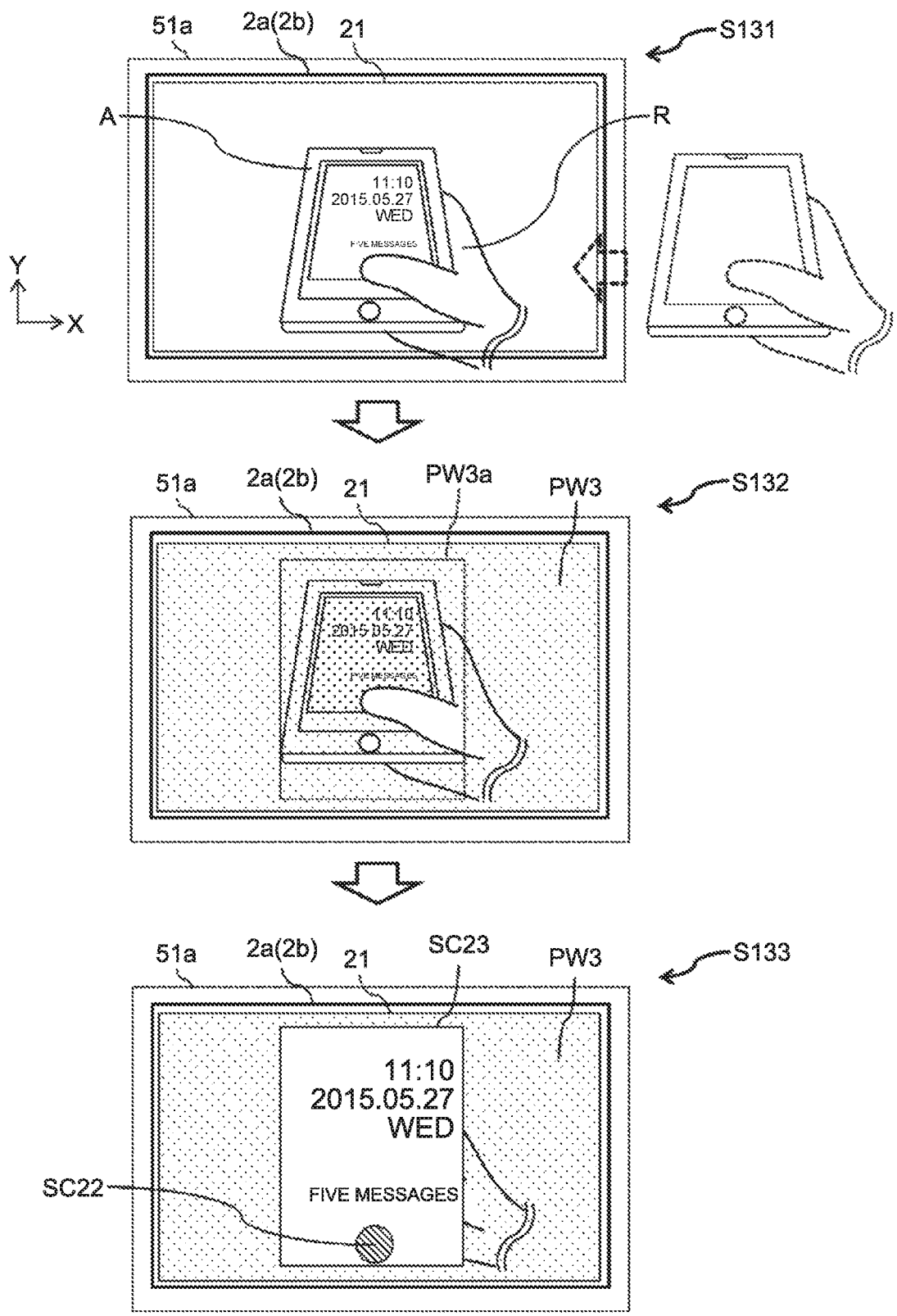
FIG. 20 is a diagram illustrating a twelfth example of the process performed by the wearable device according to some embodiments.

FIG. 20 is a diagram illustrating a twelfth example of the process performed by the wearable device 1 according to some embodiments.

As illustrated at Step S131, the smartphone A is in a state of being inclined by a predetermined angle or more with respect to the display surface of the display unit 2 of the wearable device 1. In this state, if the smartphone A moves to the inside of the predetermined space 51a, the wearable device 1 detects that the smartphone A is present in the predetermined space 51a. The wearable device 1 calculates an inclination angle of the display screen of the smartphone A with respect to the display surface of the display unit 2 of the wearable device 1 based on a detection result of the detector 5. If the inclination angle is greater than a predetermined angle, as illustrated at Step S132, the wearable device 1 activates the imager 3 (out-camera), and displays a captured image captured by the imager 3 on the display unit 2 (the captured image displayed by the display unit 2 is referred to as a preview window PW3). The wearable device 1 analyzes the captured image, and therefore, calculates a range PW3a encompassing the smartphone A that appears in the preview window PW3. The wearable device 1 displays a screen SC23 including additional information that is based on the display control signal received from the smartphone A, as an image with a size equal to or greater than the size of the range PW3a on the display unit 2 (Step S133). The wearable device 1 may display a visual effect SC22 to allow the user to recognize a position in touch with the display screen of the smartphone A.

In this manner, the wearable device 1 has a configuration to, when the display screen of the smartphone A (another electronic device) is inclined by a predetermined angle or more with respect to the display surface of the display unit 2 of the wearable device 1 based on the detection result of the detector 5, display an image related to display of the smartphone A so as to overlap with the smartphone A. Therefore, when the smartphone A displays an image at an angle at which the user is unable to view, an image with the same contents is alternatively displayed again on the wearable device 1 so that the user can easily view the image.

While examples of some embodiments have been described above, the embodiments may be characterized as a network system configured by the wearable device and another electronic device. For example, a network system according to one example of some embodiments may be characterized as a network system that includes a wearable device with a display unit arranged in front of eyes and another electronic device with a display function. The wearable device includes a detector configured to detect whether the another electronic device is present in a predetermined space in front of the wearable device, transmits information indicating detection to the another electronic device upon detecting that the another electronic device is present in the predetermined space, transmits a display control signal for displaying additional information related to display contents displayed by the another electronic device to the wearable device upon receiving the information, and displays the additional information based on the display control signal on the display unit upon receiving the display control signal.

While examples of the embodiments have been descried above, it should be noted that various changes and modifications based on this disclosure may be easily made by a person skilled in the art. Therefore, various changes and modifications are included in the scope of the appended claims. All technical elements disclosed in this specification may be rearranged without contradiction. A plurality of constituent elements may be combined into a single element or may be divided.

In the above-described embodiments, examples have been described in which the wearable device 1 has a shape like a pair of glasses; however, the shape of the wearable device 1 is not limited thereto. For example, the wearable device 1 may have a shape like a helmet type that covers approximately the whole upper half of the head of a user. Alternatively, the wearable device 1 may have a shape like a mask type that covers approximately the whole face of a user.

In the above-described embodiments, a configuration has been described in which the display unit 2 includes a pair of the display unit 2a and the display unit 2b that are mounted in front of the left eye and the right eye of a user; however, the embodiments are not limited thereto. The display unit 2 may be configured to include a single display unit mounted in front of one of the left eye and the right eye of a user.

In the above-described embodiments, a configuration has been described in which an edge portion of the front surface portion surrounds the entire circumference of an edge of the display region 21 of the display unit 2; however, the embodiments are not limited thereto. It may be possible to configure such that only a part of the edge of the display region 21 of the display unit 2 is surrounded.

In the above-described embodiments, a configuration has been described in which a hand or a finger is detected as the upper limb of a user by the imager 3 and the imager 4 (or the detector); however, the hand and the finger may be detected in the same manner even in a state in which the user is wearing mittens or gloves.

In the above-described embodiments, configurations and operations of the wearable device 1 have been described; however, the embodiments are not limited thereto. It may be possible to configure a method and a program with the constituent elements. As described above, it may be possible to configure a network system including the wearable device 1 and another electronic device.

The invention claimed is:

1. A wearable device including a display unit arranged in front of eyes, the wearable device comprising:
   a detector configured to detect whether another electronic device is present in a predetermined space in front of the wearable device, wherein
   additional information related to predetermined display is displayed on the display unit in response to the another electronic device being present in the predetermined space and performing the predetermined display,
   wherein the additional information is displayed in an enlarged manner in response to a detection of the another electronic device being moved from an inside of the predetermined space to an outside thereof while the additional information is being displayed on the display unit, and
   in response to the another electronic device being moved from the outside of the predetermined space to the inside of the predetermined space in a predetermined direction, a size of the additional information is reduced in the predetermined direction.

2. The wearable device according to claim 1, the wearable device comprising:
   a controller configured to detect an outline of the another electronic device in the predetermined space based on a detection result of the detector, wherein
   the controller is configured to display an image including the additional information on the display unit such that the image is located outside the outline of the another electronic device.

3. The wearable device according to claim 2, wherein the controller is configured to display an image including the additional information on the display unit such that one side of the image is aligned approximately parallel to one side of the outline.

4. The wearable device according to claim 2, wherein the controller is configured to display different additional information on the display unit in accordance with a contact position of a user with respect to a display screen of the another electronic device.

5. The wearable device according to claim 2, wherein the display control signal includes a display direction of the additional information, and the controller is configured to display the additional information on a side of the display direction relative to the another electronic device based on the display control signal.

6. The wearable device according to claim 5, wherein the controller is configured to transmit a signal indicating that an image including the additional information is selected to the another electronic device if a movement of an upper limb of a user in the display direction is detected based on a detection result of the detector.

7. The wearable device according to claim 1, the wearable device comprising:
a controller configured to display the additional information on the display unit upon detecting that a predetermined contact operation is performed using an object in contact with the another electronic device while the another electronic device is present in the predetermined space.

8. The wearable device according to claim 7, wherein the controller is configured to display an operation screen for an operation related to the additional information on the display unit on displaying the additional information on the display unit.

9. The wearable device according to claim 1, wherein the additional information is displayed in a non-overlapping manner with the another electronic device in response to the another electric device being present in the predetermined space in front of the wearable device.

10. A wearable device comprising:
a display unit arranged in front of eyes; and
a detector configured to detect a predetermined object that is present in a real space based on a captured image of the predetermined object captured by an imager, wherein in response to the predetermined object being present in a predetermined space in front of a user,
the captured image of the predetermined object is analyzed to calculate a range encompassing the predetermined object viewed through the display unit,
an image including additional information related to the predetermined object is displayed in the calculated range, and
the additional information is displayed in the image so that the additional information is not displayed inclined to an outline of a display region of the display unit the detector is configured to detect an outline of the predetermined object, and the display unit is configured to, in response to the outline of the predetermined object inclined with respect to the outline of the display region of the display unit, display the additional information in alignment with respect to the outline of the display region of the display unit.

11. The wearable device according to claim 10, wherein the image is an opaque image.

12. The wearable device according to claim 10, wherein the predetermined object is an electronic device including a display function, and
the image is identical to a display image that is displayed while the electronic device is present in the predetermined space.

* * * * *